United States Patent
Endo et al.

(10) Patent No.: US 9,996,937 B2
(45) Date of Patent: Jun. 12, 2018

(54) IMAGE APPARATUS, IMAGE PROCESSING METHOD, AND COMPUTER READABLE, NON-TRANSITORY MEDIUM

(71) Applicant: FUJITSU LIMITED, Kawasaki-shi, Kanagawa (JP)

(72) Inventors: Susumu Endo, Kawasaki (JP); Masaki Ishihara, Kawasaki (JP); Masahiko Sugimura, Kawasaki (JP); Takayuki Baba, Kawasaki (JP); Yusuke Uehara, Kawasaki (JP); Akira Miyazaki, Kawasaki (JP); Hirohisa Naito, Fuchu (JP); Hiroaki Takebe, Kawasaki (JP)

(73) Assignee: FUJITSU LIMITED, Kawasaki-shi (JP)

( * ) Notice: Subject to any disclaimer, the term of this patent is extended or adjusted under 35 U.S.C. 154(b) by 7 days.

(21) Appl. No.: 15/198,812

(22) Filed: Jun. 30, 2016

(65) Prior Publication Data

US 2017/0011510 A1 Jan. 12, 2017

(30) Foreign Application Priority Data

Jul. 6, 2015 (JP) ................................ 2015-135336

(51) Int. Cl.
G06K 9/00 (2006.01)
G06T 7/194 (2017.01)
G06T 7/11 (2017.01)

(52) U.S. Cl.
CPC ............... *G06T 7/194* (2017.01); *G06T 7/11* (2017.01); *G06T 2207/30024* (2013.01)

(58) Field of Classification Search
None
See application file for complete search history.

(56) References Cited

U.S. PATENT DOCUMENTS

| 4,644,583 A | 2/1987 | Watanabe et al. |
| 2010/0166271 A1 | 7/2010 | Nishida et al. |
| 2012/0275681 A1 | 11/2012 | Honda et al. |

FOREIGN PATENT DOCUMENTS

| JP | 60-179881 A | 9/1985 |
| JP | 4-32428 A | 2/1992 |
| JP | 5-73673 A | 3/1993 |
| JP | 5-157707 A | 6/1993 |
| JP | 2791303 B2 | 8/1998 |
| JP | 2000-270840 A | 10/2000 |
| JP | 2003-85533 A | 3/2003 |
| JP | 2008-15714 A | 1/2008 |
| JP | 2008-295424 A | 12/2008 |

(Continued)

OTHER PUBLICATIONS

Huseyin Ates, et al., "An image-processing based automated bacteria colony counter", Computer and Information Sciences, 24th International Symposium on, Sep. 1, 2009, p. 18-23.

(Continued)

*Primary Examiner* — Atiba O Fitzpatrick
(74) *Attorney, Agent, or Firm* — Westerman, Hattori, Daniels & Adrian, LLP

(57) ABSTRACT

An image processor includes: a memory; and a processor, wherein the processor is configured to: extract an arc area in an image captured by an image sensor; and determine whether a portion that protrudes from an arc in the arc area satisfies a first reference regarding a shape and detect the portion as a colony candidate when it is determined that the portion satisfies the first reference.

20 Claims, 24 Drawing Sheets

(56) References Cited

FOREIGN PATENT DOCUMENTS

| JP | 2011-58940 A | 3/2011 |
|---|---|---|
| JP | 2011-115148 A | 6/2011 |
| JP | 2014-39519 A | 3/2014 |
| JP | 2015-029504 A | 2/2015 |

OTHER PUBLICATIONS

Quentin Geissman, et al., "OpenCFU, a New Free and Open-Source Software to Count Cell Colonies and Other Circular Objects", PLOS ONE vol. 8, No. 2, Feb. 15, 2013, pp. e54072.

J. Marotz, et al., "Effective object recognition for automated counting of colonies in petri dishes (automated colony counting)", Computer Methods and Programs in Biomedicine, vol. 66, No. 2-3, Sep. 1, 2001, pp. 183-198.

Extended (Supplementary) European Search Report dated Nov. 7, 2016, issued in counterpart European Patent Application No. 16174739.9. (8 pages).

Office Action dated Mar. 28, 2018, issued in counterpart Chinese Application No. 201610496447.1, with English translation. (16 pages).

Office Action dated Mar. 29, 2018, issued in counterpart European Application No. 16174739.9. (6 pages).

FIG. 1A
FIG. 1B
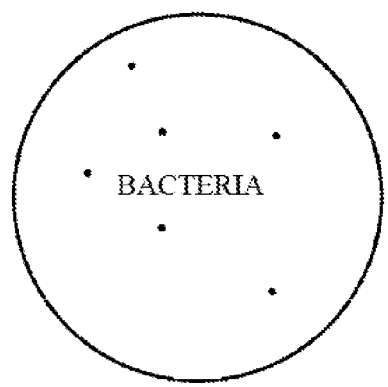
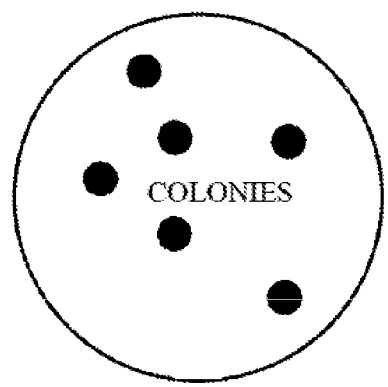
PETRI DISH
PETRI DISH

FIG. 3A
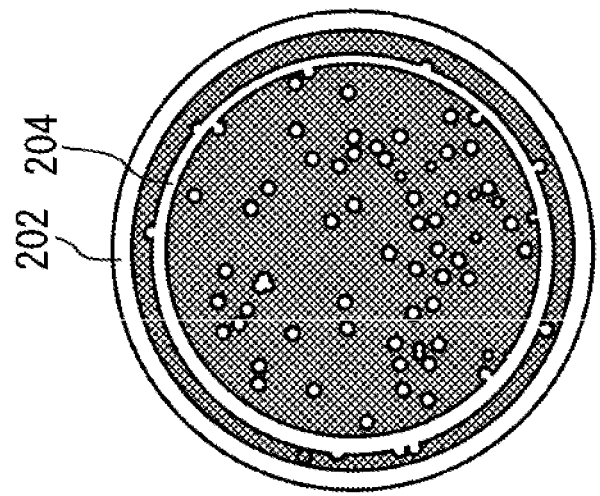
FIG. 3B
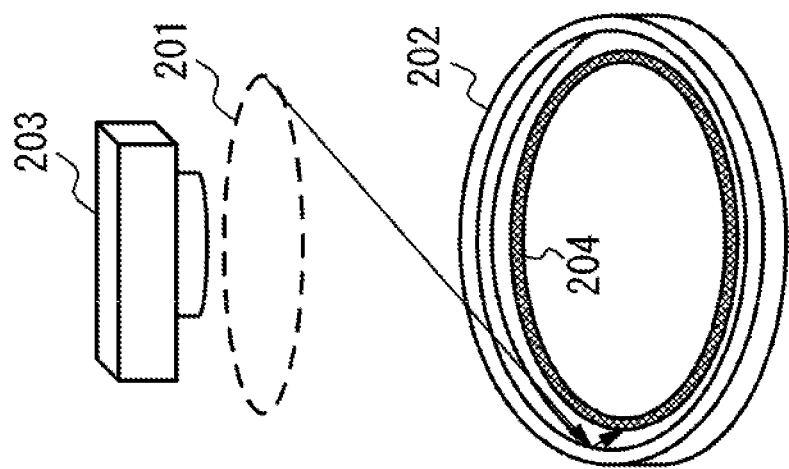

FIG. 8A
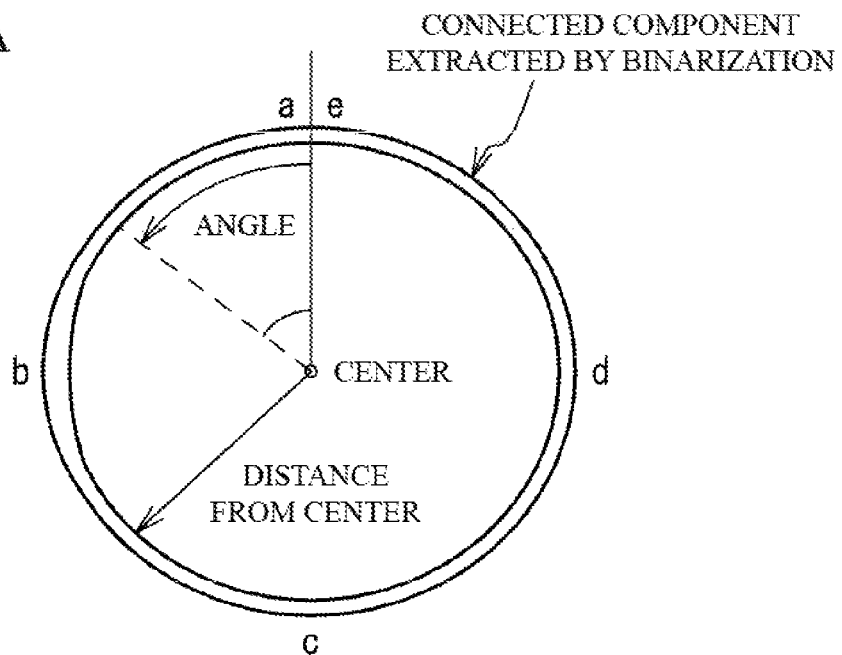
FIG. 8B
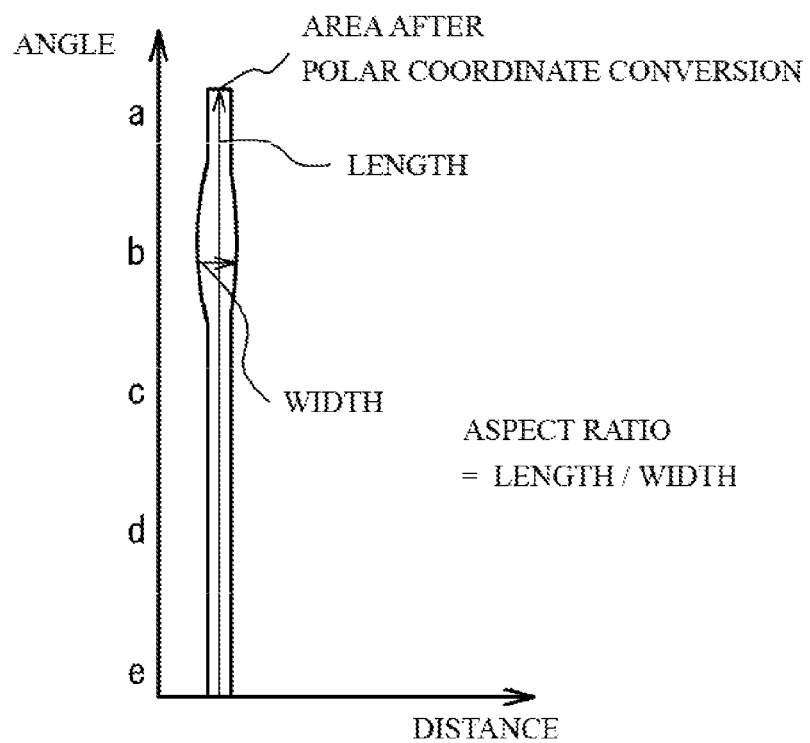

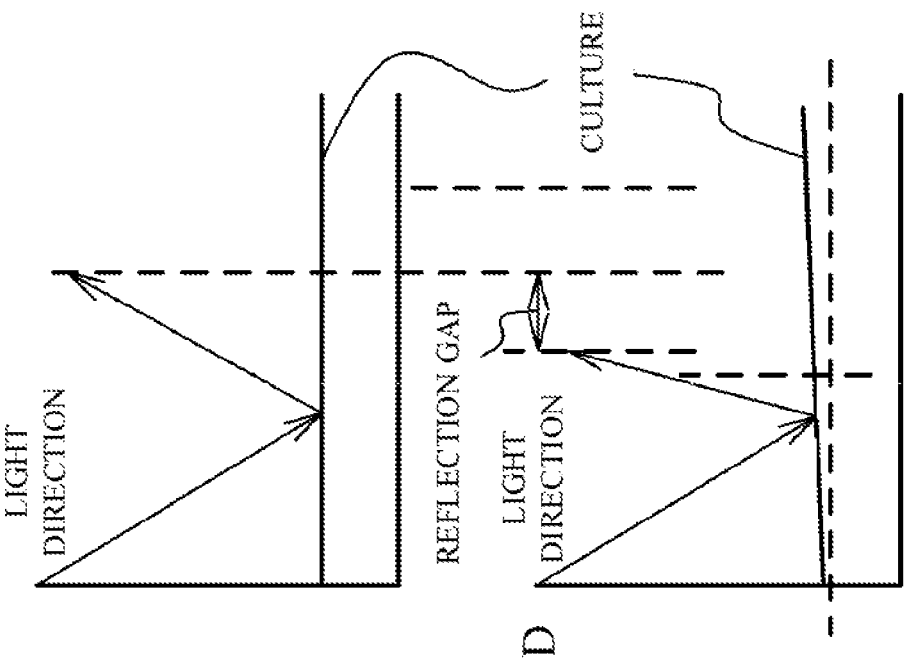
FIG. 9C
FIG. 9D
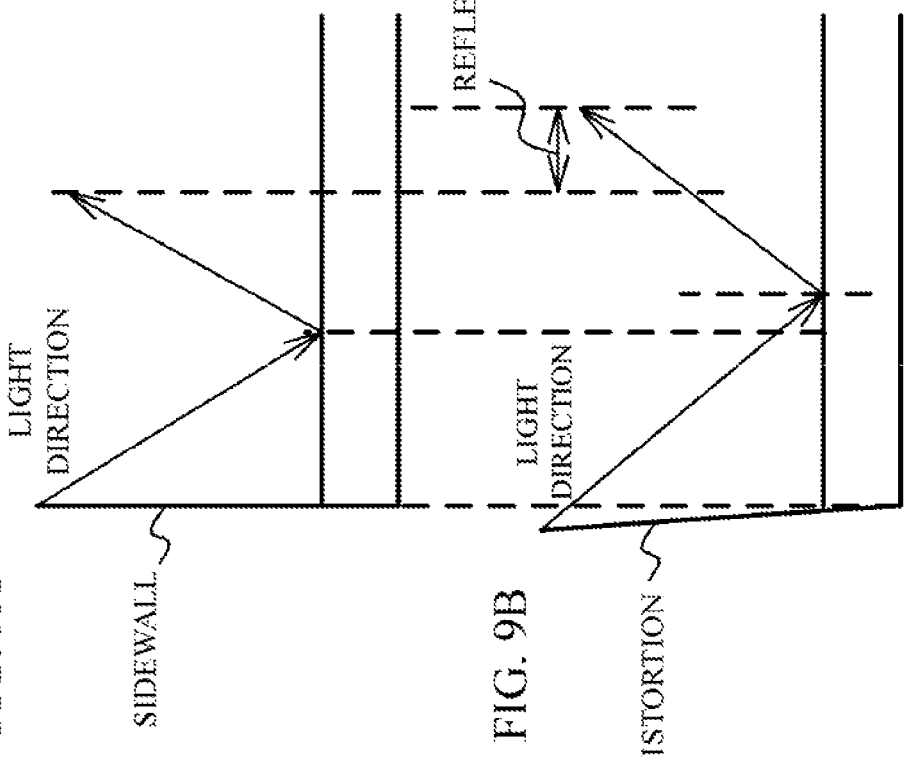
FIG. 9A
FIG. 9B

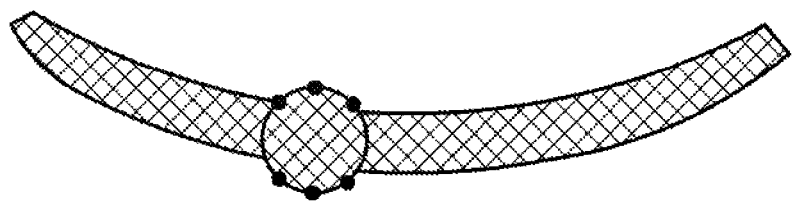
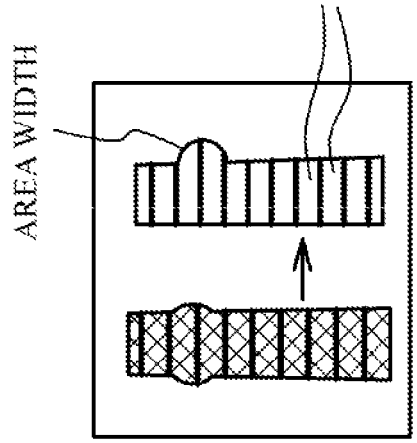
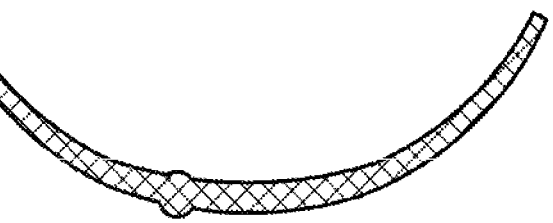
FIG. 11A  FIG. 11B  FIG. 11C

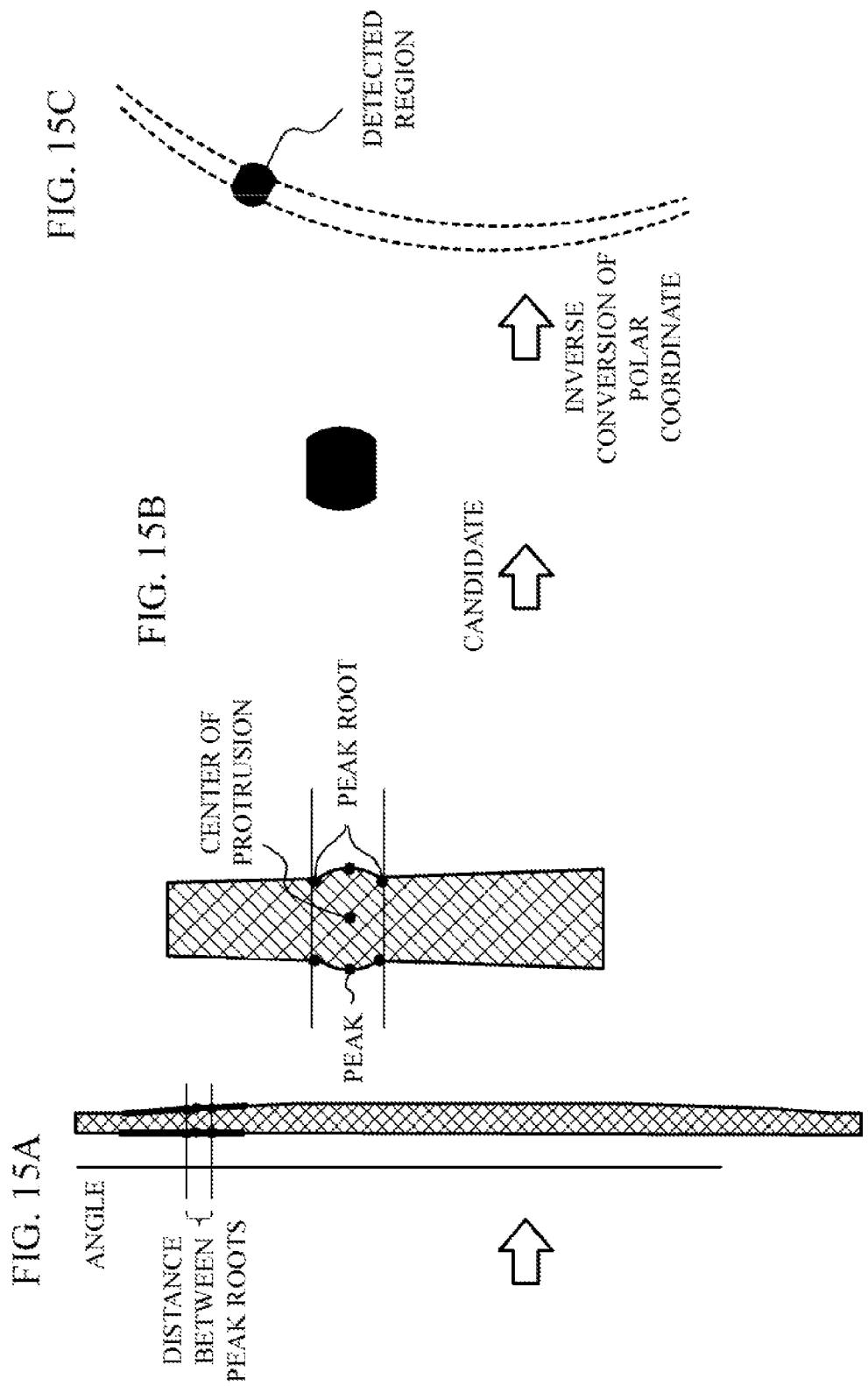

FIG. 16A
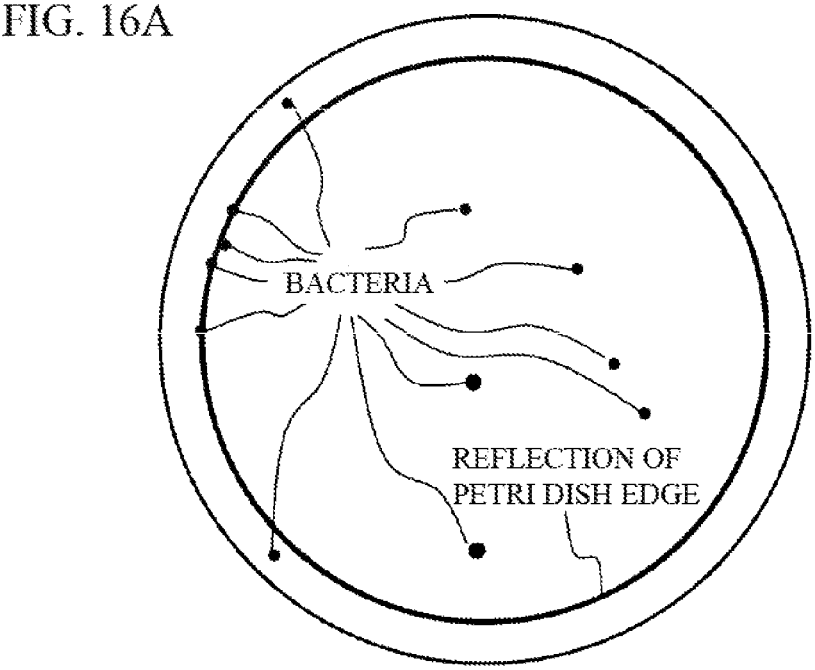
FIG. 16B
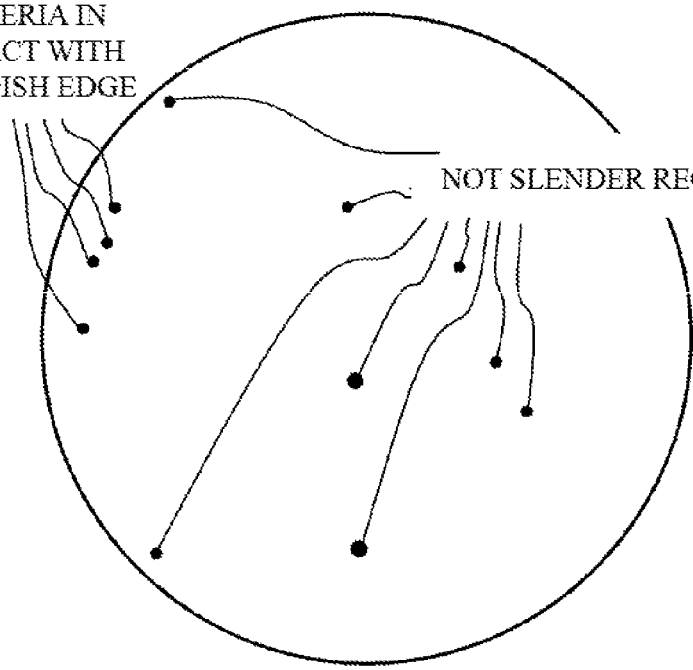

AREA WIDTH

| ANGLE | START RADIUS | END RADIUS | WIDTH |
|-------|--------------|------------|-------|
| 20    | 405          | 409        | 4     |
| 20    | 419          | 422        | 3     |
| ...   |              |            |       |

FIG. 23A

| START ANGLE | END ANGLE | START RADIUS | END RADIUS |
|---|---|---|---|
| 0 | 359 | 404 | 412 |
| 70 | 220 | 419 | 426 |
| 72 | 75 | 380 | 386 |

FIG. 23B

| START ANGLE | END ANGLE | START RADIUS | END RADIUS | ASPECT RATIO |
|---|---|---|---|---|
| 0 | 359 | 404 | 412 | 44.9 |
| 70 | 220 | 419 | 426 | 7.14 |
| 72 | 75 | 380 | 386 | 0.67 |

IMAGE APPARATUS, IMAGE PROCESSING METHOD, AND COMPUTER READABLE, NON-TRANSITORY MEDIUM

CROSS-REFERENCE TO RELATED APPLICATION

This application is based upon and claims the benefit of priority of the prior Japanese Patent Application No. 2015-135336, filed on Jul. 6, 2015, the entire contents of which are incorporated herein by reference.

FIELD

A certain aspect of embodiments described herein relates to an image apparatus, an image processing method, and a computer-readable, non-transitory medium.

BACKGROUND

It is difficult to directly look at bacterium because the bacterium are very small. Therefore, colonies are grown by culturing bacterium. For example, the number of colonies of bacterium on a culture medium is automatically counted from as captured image (see Japanese Patent Application Publication No. 2014-39519).

SUMMARY

According to an aspect of the present invention, there is provided an image apparatus including: an extractor configured to extract an arc area in an image captured by an image sensor; and a detector configured to determine whether a portion that protrudes from an arc in the arc area satisfies a first reference regarding a shape and detect the portion as a colony candidate when it is determined that the portion satisfies the first reference.

BRIEF DESCRIPTION OF DRAWINGS

FIG. 1A and FIG. 1B illustrate colonies.
FIG. 3A illustrates an image device;
FIG. 3B illustrates as petri dish seen from above;
FIG. 8A illustrates as reflection area of a petri dish edge;
FIG. 8B illustrates a reflection area after conversion;
FIG. 9A illustrates a reflection without distortion in a petri dish shape;
FIG. 9B illustrates a reflection with distortion in as petri dish shape;
FIG. 9C illustrates as reflection without unevenness in a culture medium;
FIG. 9D illustrates a reflection with unevenness in a culture medium;
FIG. 11A illustrates a reflection area of as petri dish edge with which a colony candidate overlaps;
FIG. 11B illustrates a detection of a protrusion protruding to both sides;
FIG. 11C illustrates a determination whether a protrusion portion has a circle shape;
FIG. 15A to FIG. 15C illustrate a determination of a circle;
FIG. 16A illustrates a binarized image before detection of a colony candidate;
FIG. 16B illustrates a binarized image after detection of a colony;
FIG. 23A illustrates an area obtained by repetition of Steps S72 to S75;
FIG. 23B illustrates an obtained aspect ratio obtained.

DESCRIPTION OF EMBODIMENTS

A description will be given of an outline of a bacteria test. The number of bacterium is being tested in an eating place or a food maker. It is difficult to directly look at bacterium because the bacterium are very small. Therefore, as illustrated in FIG. 1A, target food is diluted and is coated on a culture medium. And, bacterium are cultured for a few days. Thus, as illustrated in FIG. 1B, the number of the bacterium is increased, and colonies having a visible size are grown. By counting the colonies, the number of bacterium can be tested. However, a method of counting colonies with eyes is inefficient. And so, a technology for easily counting colonies is desired.

For example, there is known a method in which a device automatically counts colonies. In the method, an image after culturing bacterium is captured, and the colonies are counted. For example, in the method, a user determines a brightness value range of colonies. And, areas of pixels having the brightness value range are automatically extracted as bacterium.

Figure 2A:
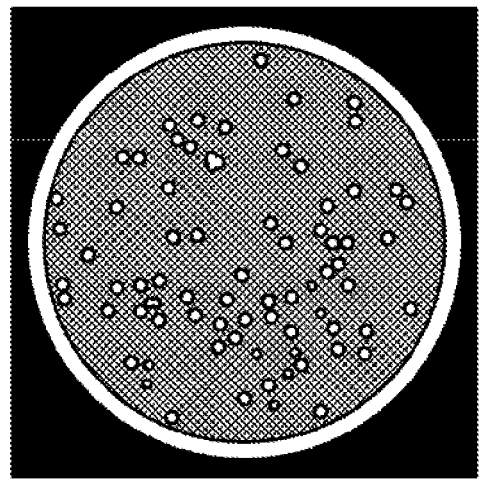
FIG. 2A illustrates a grayscale image.
Figure 2B:
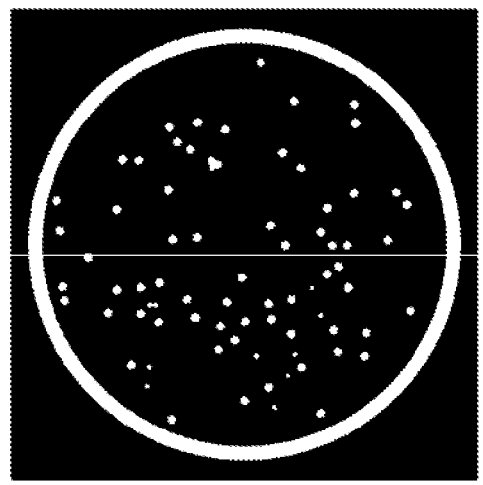
FIG. 2B illustrates a binarized image.

FIG. 2A illustrates a grayscale image. When areas brighter than a threshold determined by a user are extracted by binarization a binarized image illustrated in FIG. 2B is obtained. As illustrated in FIG. 2B, colonies have white color. However, with a simple binarization a petri dish also has white color. And so, a user determines a position of the petri dish. An area inside the determined position is used as an analysis area. For example, a relative position between a camera and the peri dish as an object is fixed, and an image of the petri dish is captured. In this case, the position of the petri dish is fixed. Therefore, the position is used for the analysis.

Figure 2C:
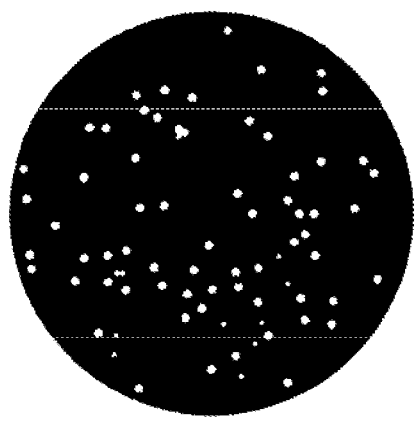
FIG. 2C illustrates an example of a binarized image that is obtained by extracting an inner portion of a petri dish.

FIG. 2C illustrates an example of a binarized image that is obtained by extracting an inner portion of the petri dish. When areas in which white pixels are adjacent to each other are counted by a labeling method, the number of colonies is obtained. However, when a contrast of the captured image is insufficient, the colonies may not be detected or the colonies may be detected by mistake. And so, in order to improve the contrast, optical intensity of a light source may be enhanced.

FIG. 3A illustrates an image device. As illustrated in FIG. 3A, the image device captures an image of a petri dish 202 with a camera 203 when a light source 201 radiates a light to the petri dish 202. However, a light inclined with respect to the petri dish 202 is reflected by an edge of the petri dish 202. Therefore, when the optical intensity of the light source 201 is large, an image captured by the camera 203 may includes a reflection area 204 caused by the light reflected by the edge of the petri dish 202. For example, as illustrated in FIG. 3A, the reflection area 204 may concentrically appear inside of the edge of the petri dish 202. FIG. 3B illustrates the petri dish 202 seen from above.

In this manner, the reflection by the edge of the petri dish 202 may overlap with colonies. In this case, it is difficult to detect colonies. In the following embodiments, a description will be given of an image processor, an image processing method and an image processing program that are capable of detecting colonies.

[First Embodiment]

Figure 4A:
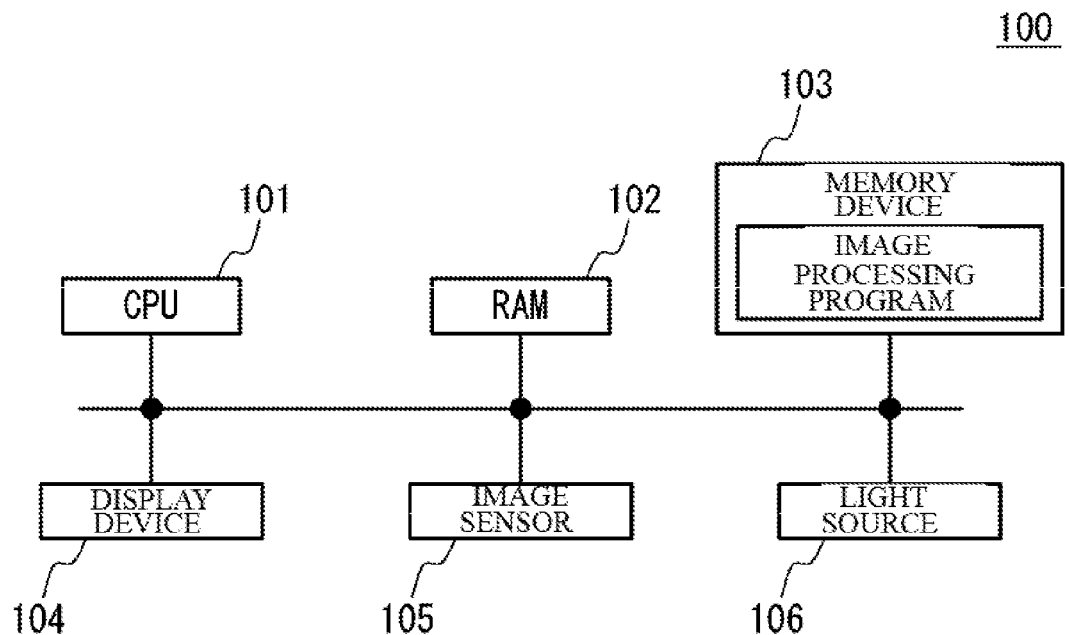
FIG. 4A illustrates a block diagram of a hardware structure of an image processor in accordance with a first embodiment.

FIG. 4A illustrates a block diagram of a hardware structure of an image apparatus 100 in accordance with a first embodiment. As illustrated in FIG. 4A, the image apparatus 100 has a CPU 101, a RAM 102, a memory device 103, a display device 104, an image sensor 105, a light source 106 and so on.

The CPU 101 is a central processing unit. The CPU 101 has one or more cores. The RAM (RandomAccess Memory) 102 is as volatile memory that temporarily stores a program executed by the CPU 101, a data processed by the CPU 101, and so on. The memory device 103 is a non-volatile storage device. The memory device 103 may be a RUM (Read Only Memory), a solid state drive (SSD) such as a flash memory, or a hard disk driven by a hard disk drive. The memory device 103 stores an image processing program and so on.

The display device 104 is, for example, a liquid crystal display, an eleoroluminescence panel or the like, and displays an image captured by the image sensor 105, the counted number of colonies and so on. The image sensor 105 is an image sensor that can capture an image of cultured bacterium. For example, the image sensor 105 is a CMOS (Complementary Metal Oxide Semiconductor) camera or the like. The light source 106 is a device for radiating as light to cultured bacterium. A positional relationship among the light source 106, the image sensor 105 and the petri dish is the same as FIG. 3A.

For example, the image sensor 105 captures an image after culturing on a culture medium of a petri dish such as a mannitol salt agar medium to which egg yolk is added. A position of the petri, dish is determined in advance. For example, there is known a method of overlapping a circle analysis area with a captured image and roughly locating the petri dish. And there is a method of analyzing the image and extracting a circle of the petri dish with a blown method such as a Hough transform.

Figure 4B:
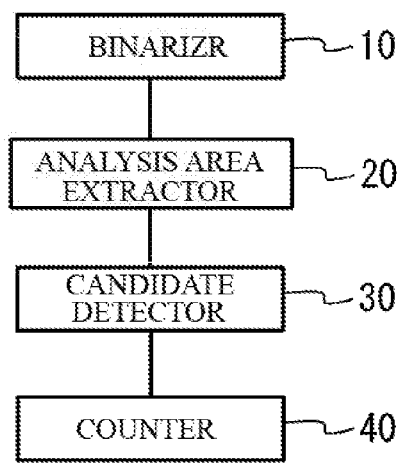
FIG. 4B illustrates as block diagram of each function achieved by execution of an image processing program.

The image processing program stored in the memory device 103 is developed to the RAM 102 so as to be executed. The CPU 101 executes the image processing program developed to the RAM 102. Thus, the image apparatus 100 executes an image process. FIG. 4B illustrates a block diagram of each function achieved by execution of the image processing program. By the execution of the image processing program, a binarizer 10, an analysis area extractor 20, a candidate detector 30 and a counter 40 are achieved in the image apparatus 100.

The binarizer 10 classifies areas in accordance with brightness values in the image captured by the image sensor 105. In the embodiment, the binarizer 10 binarizes the image and obtains a binarized image. The analysis area extractor 20 acts as an example of an extractor for extracting an arc area in each area classified by the binarizer 10. In the embodiment, the analysis area extractor 20 extracts a reflection area of a petri dish edge appearing as a circle (circular arc). The candidate detector 30 acts as a detector that determines whether a portion protruding from the circular arc satisfies a first reference regarding a shape in the circular arc extracted by the analysis area extractor 20, and detects the portion as a candidate of a colony when it is determined that the portion satisfies the first reference. The counter 40 determines whether the candidate detected by the candidate detector 30 is a colony, and counts the colony.

Figure 5:
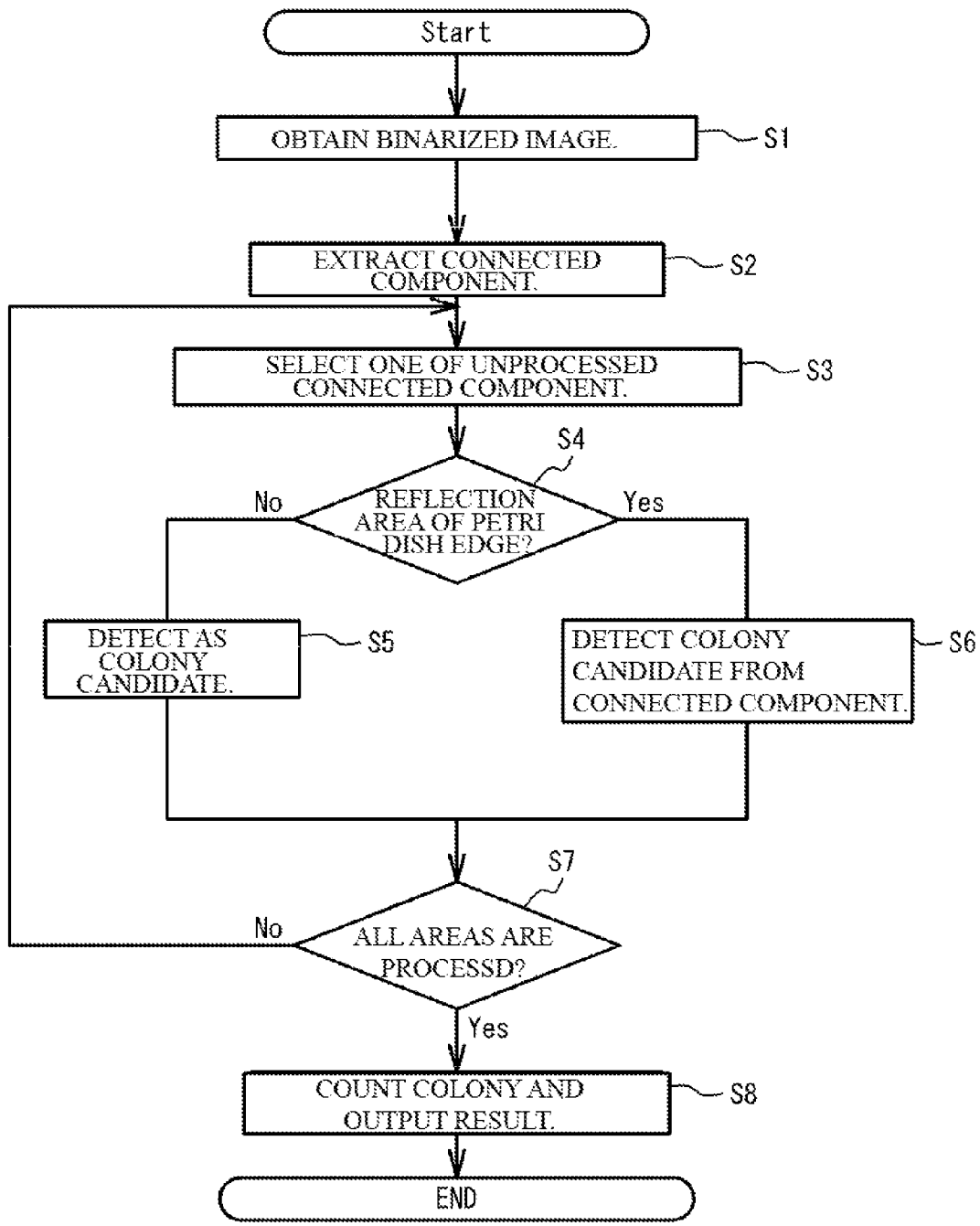
FIG. 5 illustrates an example of a flowchart executed by an image processor.

Next, a description will be given of details of an operation of the image apparatus 100. FIG. 5 illustrates an example of a flowchart executed by the image apparatus 100. As illustrated in FIG. 5, the binarizer 10 obtains a binarized image by binarizing the image obtained by the image sensor 105 (Step S1). Next, the binarizer 10 extracts a connected component in the binarized image (Step S2). The connected component will be described later.

Next, the analysis area extractor 20 selects one of unprocessed connected components (Step S3). Then, the analysis area extractor 20 determines whether the connected component selected in Step S3 is a reflection area of the petri dish edge (Step S4). When it is determined as "No" in Step S4, the candidate detector 30 detects the connected component as a colony candidate (Step S5). When it is determined as "Yes" in Step S4, the analysis area extractor 20 extracts the connected component as a reflection area of the petri dish edge and the candidate detector 30 detects a colony candidate from the reflection area (Step S6).

After execution of Step S5 or Step S6, the candidate detector 30 determines whether Step S5 or Step S6 is executed with respect to all connected components (Step S7). When it is determined as "No" in Step S7, Step S3 is executed again. When it is determined as "Yes" in Step S7, the counter 40 counts candidates determined as a colony from the colony candidates and outputs the count result (Step S8). For example, the counter 40 may count all candidates detected by the candidate detector 30. Alternately, the counter 40 may count only candidates satisfying a predetermined condition. For example, the counter 40 may count colony candidates of which circular degree (area circumference length) is equal to or greater than a threshold under a condition where a colony has a circular shape. With the executions mentioned above, it is possible to count colonies.

Figure 6A:
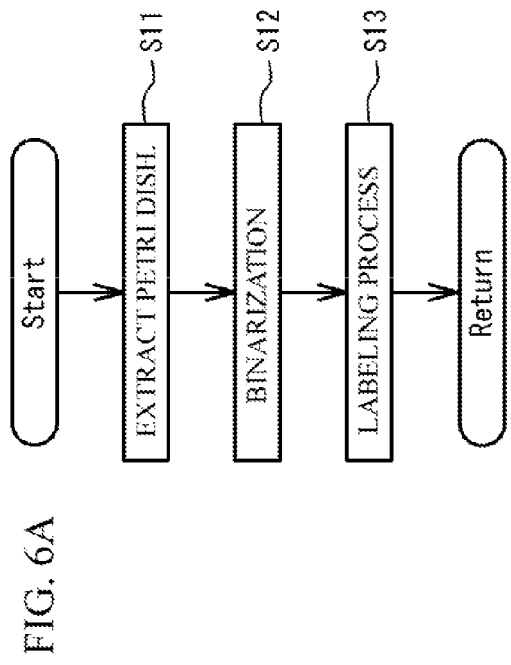
FIG. 6A illustrates as flowchart for describing details of Step S1 and Step S2.

FIG. 6A illustrates a flowchart for describing details of Step S1 and Step S2. When the petri dish is precisely positioned at a center of the image sensor 105, the position of the petri dish is fixed in an image captured by the image sensor 105. Thus, it is possible to determine the position of the perti dish in advance. And so, as illustrated in FIG. 6A, in the image captured by the image sensor 105, the binarizer 10 determines an outer circumference of the petri dish from the position of the petri dish determined in advance, and removes the edge of the image (Step S11). For example, the binarizer 10 may delete all area outside of the outer circumference of the petri dish.

A method of detecting the position of the petri dish edge may be used, because the position of the petri dish may be slightly shifted. For example, the circle of the petri dish may be extracted by using Hough transform or the like. There is a method of extracting an edge, obtaining circle including all pixels and estimating a position of an outer circumference and a center of the petri dish under a condition that there is no edge around the petri dish. A conventional method such as Canny edge detection, Sobel filter, Laplacian filter or the like can be used as the method of extracting the edge.

Figures 6B, 6C, 6D:
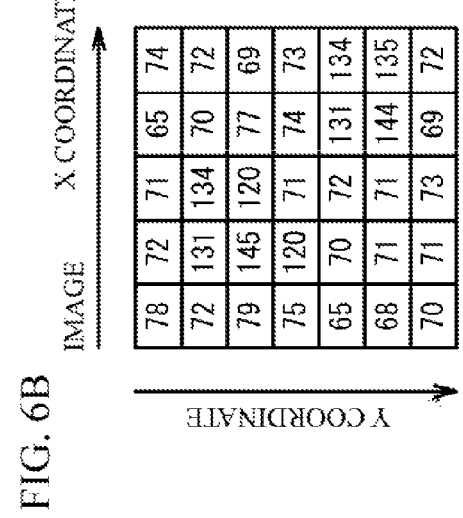
FIG. 6B illustrates an example of a brightness value of each pixel.
FIG. 6C illustrates brightness values after binarization.
FIG. 6D illustrates a result of labeling.

Next, the binarizer 10 binarizes the image in which the petri dish is deleted (Step S12). FIG. 6B illustrates an example of a brightness value of each pixel. A brightness value of a pixel of a coordinate (X, y) is expressed by "p(x, y)". The binarizer 10 replaces the p(x, y) to 255 when the p(x, y) is equal to or more than a predetermined threshold (for example, 100). The binarizer 10 replaces the p(x, y) to 0 when the p(x, y) is less than the threshold. In the embodiment, 255 and 0 are simply used. However, the values may be any different values. FIG. 6C illustrates brightness values after binarization.

Next, the binarizer 10 performs a labeling in the binarized image (Step S13). In the labeling, as illustrated in FIG. 6D, an identical number is added to pixels that have a brightness of 255 and are adjacent to each other, and the pixels are connected. And, a different number is added to the rest pixels. An area to which the identical number is aligned is referred to as a connected component. Label numbers are aligned to each pixel. Therefore, the label number L(x, y) is as follows. In this case, the label number of the connected component is larger than 0, and the label number of the rest pixels is other than 0. However, the values may be different from these values.

L(x, y)=a label number>0 when p(x, y)=255.
L(x, Y)=0 when p(x, y)=0.

Figure 7:
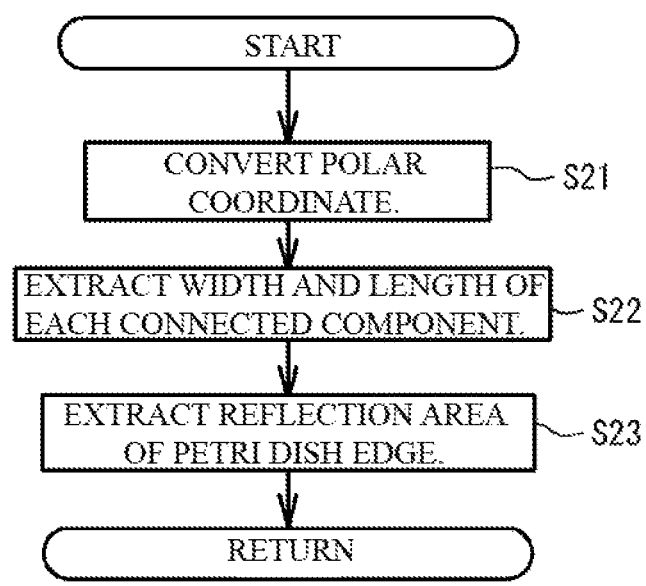
FIG. 7 illustrates an example of a flowchart executed by an analysis area extractor when the analysis area extractor extracts a reflection area of a petri dish edge.

FIG. 7 to FIG. 8B illustrate details of Step S4. FIG. 7 illustrates an example of a flowchart executed by the analysis area extractor 20 when the analysis area extractor 20 extracts the reflection area of the petri dish edge. As illustrated in FIG. 7, the analysis area extractor 20 converts each connected component into a polar coordinate (Step S21). The polar coordinate conversion is a method in which each pixel is projected to a coordinate axis r of a distance from a center and a coordinate axis θ of an angle. The center may be a center of the petri dish.

For example, the following formulas (1) and (2) achieve the conversion from a Cartesian coordinate (x, y) into a polar coordinate (r, θ). A coordinate of the center of the petri dish is (Cx, Cy). The angle θ is regulated so that the angle is 0 to 360 under a condition that a value of $\tan^{-1}$ is $-\pi$ to $+\pi$. When an interval of the angle described later is other than 1 degree, 180 in the formula may be changed.

[Formula 1]
$$r = \sqrt{(x-c_x)^2 + (y-c_y)^2} \quad (1)$$

[Formula 2]
$$\theta = \frac{180}{\pi}\tan^{-1}\frac{(y-c_y)}{(x-c_x)} + 180 \quad (2)$$

When the area of the petri dish is expressed by upper coordinate $(Sx_1, Sy_1)$ and a right upper coordinate $(Sx_2, Sy_2)$, Cx of the coordinate of the center is expressed by $Cx=(Sx_1+Sx_2)/2$ and Cy of the coordinate of the center is expressed by $Cy=(Sy_1+Sy_2)/2$.

With the method, it is possible to convert each connected component into a straight component. The reflection area of the petri dish edge is converted into a slender straight component illustrated in FIG. 8B. With a circular petri dish, the reflection area of the petri dish edge has a circular shape. When an area in which the reflection area of the petri dish edge appears with high possibility is estimated in advance, the polar coordinate conversion may be performed with respect to only a connected component around the area.

Next, the analysis area extractor 20 extracts a width and a length by obtaining a maximum value and a minimum value of a radius r and an angle θ of each connected component (Step S22). For example, the analysis area extractor 20 refers to the label number L(x, y) with respect to the coordinate during the polar conversion. The analysis area extractor 20 obtains the minimum value and the maximum value of the r and the θ of the pixel, when the value of the label number is larger than 0.

When the maximum value and the minimum value of the angle θ are simply obtained, a problem may occur during a circulation. For example, when the angle is from 350 degrees to 5 degrees, the case where the minimum value is 5 and the maximum value is 350 makes a different meaning. Therefore, the analysis area extractor 20 determines existence and non-existence of a pixel at every angle and obtains the maximum value and the minimum value of the angle based on a table of the existence and non-existence.

The analysis area extractor 20 may simply only have a flag with respect to existence or non-existence of the pixel. However, in the embodiment, the analysis area extractor 20 obtains the minimum value and the maximum value of the radius of the pixel of each angle for a latter process. In concrete, the analysis area extractor 20 initializes the minimum value and the maximum value with an initial value (for example, −1) with use of a table of the angle made in advance. The table 1 is made with an interval of one degree. However, the interval may have a value other than one degree. Next, the analysis area extractor 20 obtains the angle during the convey of the coordinate of the pixel into the polar coordinate. When the minimum value and the maximum value are nod changed from the initial value, the analysis area extractor 20 replaces a minimum radius and a maximum radius to values of radius of the converted pixels. When the Minimum radius and the maximum radius are changed from the initial values, the analysis area extractor 20 replaces the minimum radius and the maximum radius when the radius of the pixel is out of the range. The analysis area extractor 20 performs the above-mentioned process with respect to all pixels of the connected component.

TABLE 1

| ANGLE | MINIMUM RADIUS | MAXIMUM RADIUS |
|---|---|---|
| 0 | −1 | −1 |
| 1 | −1 | −1 |
| 2 | −1 | −1 |
| 3 | 250 | 252 |
| 4 | 248 | 255 |
| 5 | 251 | 252 |
| 6 | −1 | −1 |
| ... | | |
| 359 | −1 | −1 |

The analysis area extractor 20 obtains an angle (three degrees in the table 1) at which the initial value is changed to another value and an angle just before an angle (five degrees in the table 1) at which a value other than the initial value is changed to the initial value. The analysis area extractor 20 calculates a length from the obtained angles. For example, the analysis area extractor 20 calculates the length with use of a start angle "s" and an end angle "e" as follows. "max" is 360 through a calculation of 360/1 when the table is made at an interval of one degree.
Length L=e−s+1 when e>s.
Length L=s+1; max−e except for the case.

Next, the analysis area extractor 20 extracts the reflection area of the petri dish edge (Step S23). In concrete, the analysis area extractor 20 calculates an aspect ratio of each connected component. The aspect ratio is a ratio (length/width) of a length in a longitudinal direction/a width perpendicular to the longitudinal direction. In the embodiment, the analysis area extractor 20 extracts a component of which aspect ratio is larger than a threshold as the reflection area of the petri dish edge.

Next, a description will be given of details of Step S6. The candidate detector 30 detects a colony candidate from the reflection area of the petri dish edge. First, there is a method of detecting an area protruding from the reflection area of the petri dish edge as a colony candidate. However, the reflection area itself may protrude because of fluctuation. That is the width of the reflection area of the petri dish edge may be partially widened.

When a radiated light from the light source 106 has dispersion, contrasting density may occur in the reflection. When a plurality of diodes such as LEDs arrayed at a predetermined interval are used as the light source 106, an area near the diodes is bright and an area away from the diodes becomes dark. When the reflection area becomes darker, the width is enlarged. When the reflection area becomes thinner, the width becomes narrower. In this manner, the width of the reflection area has dispersion in accordance with the contrasting density.

Alternately, the width of the reflection are of the petri dish edge may have dispersion because of distortion of the petri dish shape. FIG. 9A illustrates a reflection without distortion in the petri dish shape. FIG. 9B illustrates a reflection with distortion in the petri dish shape (for example, a sidewall). As illustrated in FIGS. 9A and 9B, when the petri dish shape has distortion, the position where the reflection can be seen may be shifted and the shape of the reflection may be deformed. And, the width may have dispersion.

The width of the reflection area of the petri dish edge may have dispersion because of unevenness of the culture medium (inclination or the like). FIG. 9C illustrates a reflection in a case where unevenness does not occur in the culture medium. FIG. 9D illustrates a reflection in a case where unevenness occurs in the culture medium. As illustrated in FIG. 9C and FIG. 9D, when unevenness occurs in the culture medium, the position where the reflection can be seen may be shifted or the shape of the reflection may be deformed, and the width may fluctuate.

Even if there is variation in the width of the reflection area of the petri dish edge, the reflection area of the petri dish edge has approximately the same size as the petri dish. Therefore, a length of an arc protruding from the reflection area is large. On the other hand, the colony has a circle shape that is smaller than the petri dish. Therefore, a ratio of a protrusion amount with respect to the arc length is large. And so, in the embodiment, fluctuation of the reflection area of the petri dish edge is distinguished from colony candidates by using a first reference for distinguishing the fluctuation of the reflection area of the petri dish edge from the candidates of colony.

Figure 10A:
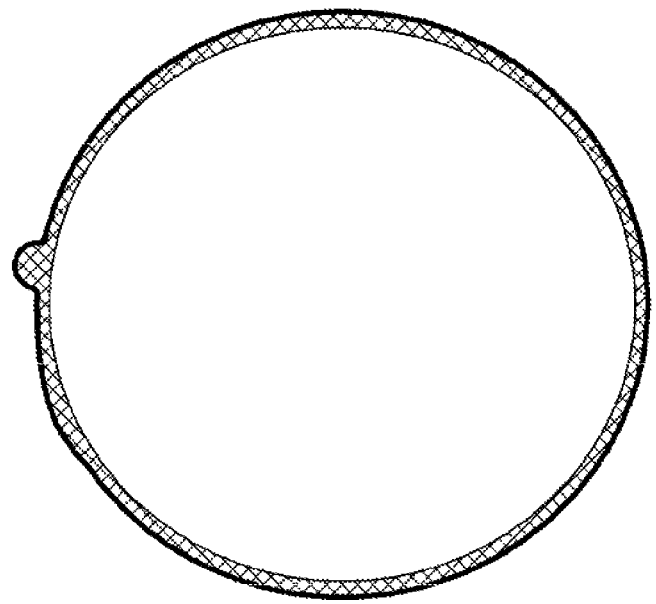
FIG. 10A illustrates a connected component extracted as a reflection area of a petri dish edge.
Figure 10B:
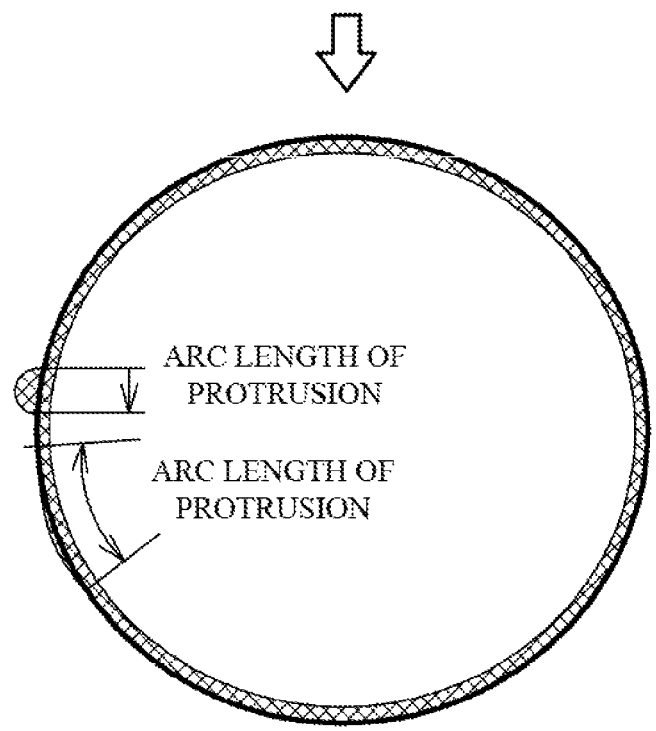
FIG. 10B illustrates as separated protrusion portion.
Figure 10C:
FIG. 10C illustrates a detected colony candidate.

FIG. 10A illustrates a connected component extracted as the reflection area of the petri dish edge. In FIG. 10A, a thick line out of the circle indicates an outer outline. The candidate detector 30 uses a predetermined function (circular function or elliptic function) and calculates an approximation formula indicating the outline shape of the outer outline. In FIG. 10B, the thick line indicates a locus of the approximation formula. The candidate detector 30 separates a group of pixels protruding from a figure (an arc portion such as a circle or an ellipse) indicated by the approximation formula. When a ratio of a protrusion amount (the number of pixels) with respect to a length (an arc length) of the protrusion portion in the extending direction of the reflection area of the petri dish edge is larger than a threshold, the candidate detector 30 detects the protrusion portion as a colony candidate. FIG. 10C illustrates a detected colony candidate. When the arc length is large, the protrusion portion is removed as fluctuation of the reflection area of the petri dish edge. The candidate detector 30 may calculate an approximation formula indicating a shape of an inner outline, separate a group of pixels protruding inward from the figure indicated by the approximation formula and performs the same determination as the determination mentioned above.

In the embodiment, it is possible to extract a slender area such as the reflection area of the petri dish edge by extracting a connected component of which the ratio of the longitudinal length with respect to the width is larger than the threshold, as an arc area. When in the arc area, a ratio of the protrusion amount of the protrusion portion with respect to the length of the protrusion portion in the longitudinal direction is larger than a threshold, the protrusion portion is detected as a colony candidate. It is therefore possible to detect a colony with high accuracy even if the reflection area of the petri dish edge overlaps with the colony.

[Second Embodiment]

In a second embodiment, a description will be given of another example of Step S6. Components of the image apparatus 100 are the same as those of the first embodiment. In the second embodiment, when a protrusion portion of the reflection area of the petri dish edge extracted by the analysis area extractor 20 protrudes toward both sides perpendicular to the longitudinal direction and the protrusion portion satisfies a second reference regarding a shape, the projection portion is detected as a colony candidate. In the embodiment, when the protrusion portion of the reflection area of the petri dish edge extracted by the analysis area extractor 20 protrudes toward both sides perpendicular to the longitudinal direction and the protrusion portion satisfies the second reference, the protrusion area satisfies the first reference.

First, a description will be given of an outline of the second embodiment. FIG. 11A illustrates the reflection area of the petri dish edge with which a colony candidate overlaps. The candidate detector 30 obtains a width at every position in the longitudinal direction. Next, the candidate detector 30 extracts an area of which width is larger than widths of other areas therearound. Thus, as illustrated in FIG. 11B, a protrusion portion protruding from the reflection area of the petri dish edge inward and outward is detected. Next, the candidate detector 30 determines whether the protrusion portion has a circular shape as illustrated in FIG. 11C. When it is determined that the protrusion portion has the circular shape, the candidate detector 30 separates the protrusion portion from the reflection area of the petri dish edge as a single circle. In the second embodiment, even if the protrusion amount from the reflection area of the petri dish edge is smaller than a threshold determined in the first embodiment, it is possible to detect the protrusion portion as a colony candidate.

Figure 12:
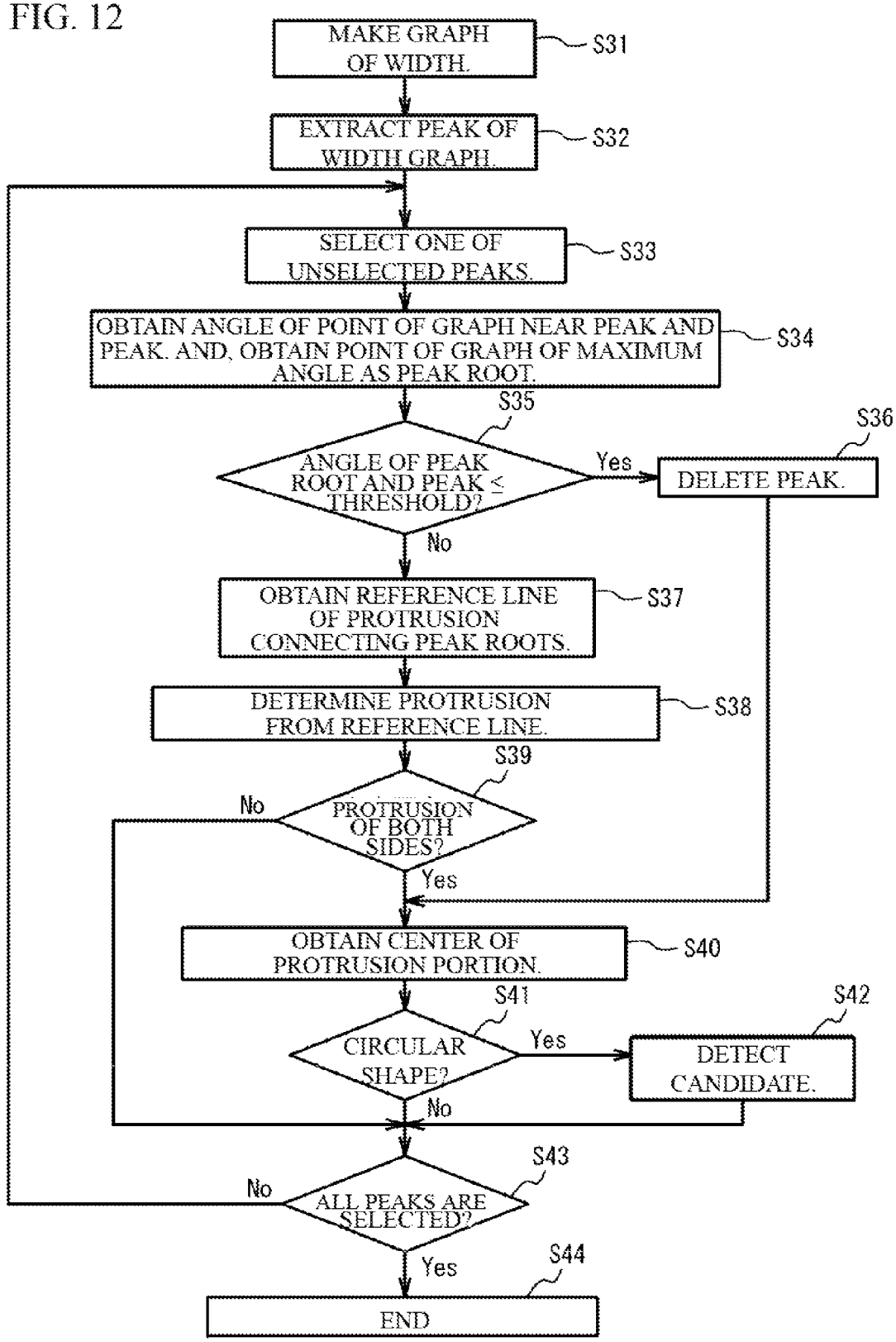
FIG. 12 illustrates a flowchart executed by a candidate detector in a second embodiment.
Figure 13:
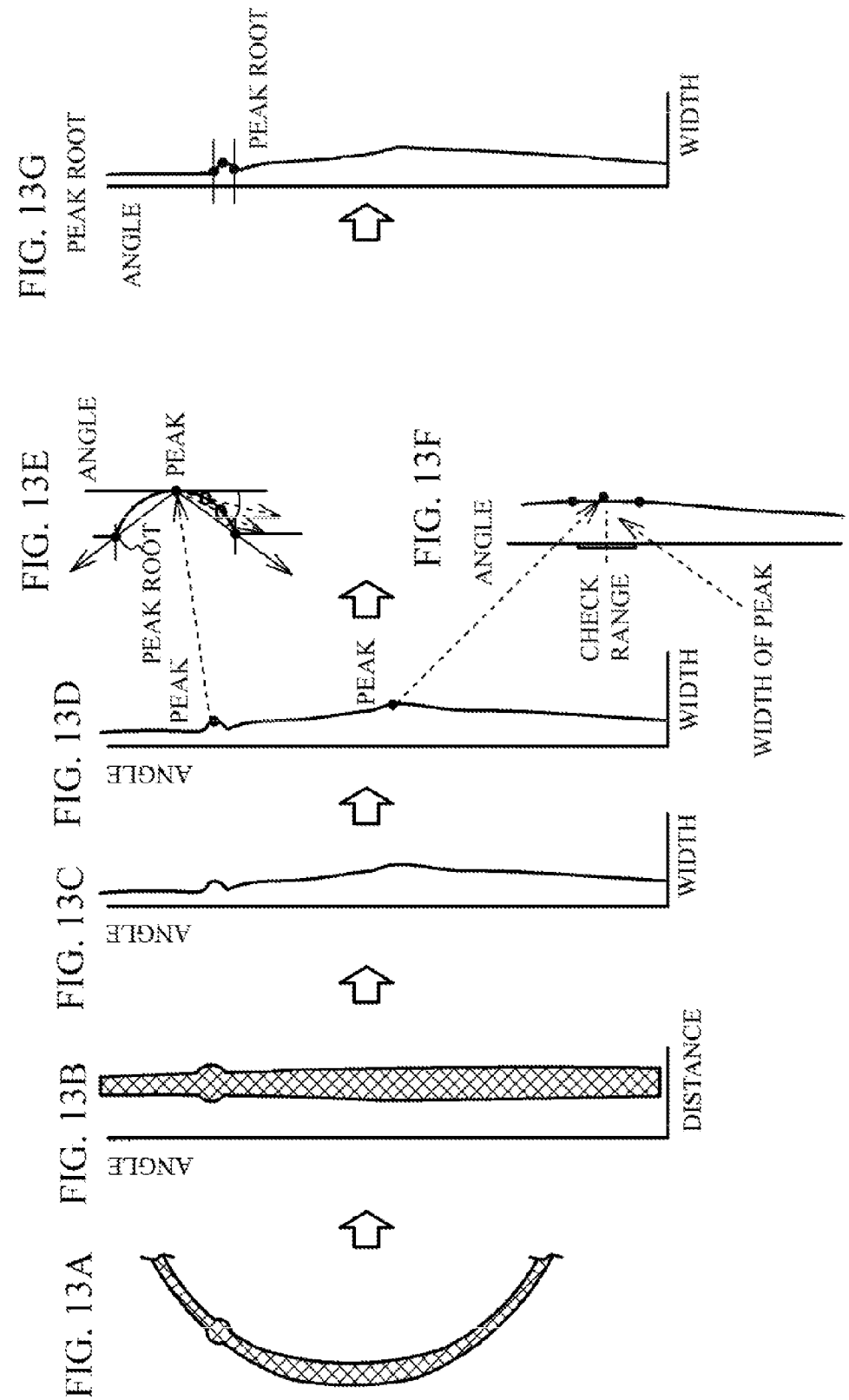
FIG. 13A to FIG. 13G illustrate calculation of an inclination of a peak.

Next, a description will be given of details of the second embodiment. FIG. 12 illustrates a flowchart executed by the candidate detector 30 in the second embodiment. As illustrated in FIG. 12, the candidate detector 30 makes a graph of a width of a colony candidate (Step S31). The candidate detector 30 obtains a result of FIG. 13B by performing a polar coordinate conversion of the reflection area of the petri dish edge illustrated in FIG. 13A. Next, the candidate detector 30 makes a mph of the width of every one angle degree. FIG. 13C illustrates the graph of the width. The candidate detector 30 obtains a maximum radius and a minimum radius of every angle of each width, and can make the graph of the width by substituting the minimum radius from the maximum radius. In Table 2, a width of an area without protrusion portions is zero.

TABLE 2

| ANGLE | WIDTH |
|---|---|
| 0 | 0 |
| 1 | 0 |
| 2 | 0 |
| 3 | 2 |
| 4 | 7 |
| 5 | 1 |
| 6 | 0 |
| ... | |
| 359 | 0 |

Next, the candidate detector 30 extracts a peak from the graph made in Step S31 (Step S32), as illustrated in FIG. 13D. The candidate detector 30 records an angle value of the peak in an angle axis. Table 3 shows the results. The candidate detector 30 determines that the peak is the case where a condition of L(a)>L(a−1) and L(a)>L(a+1), when a width of a specific angle a is L(a). The L(a) less than zero or the L(a) than 360 degrees is circulated. For example, L(−1)=(359), L(360)=L(0) and L(−5)=L(355). When the interval is not one degree, the formulas, are changed in accordance with the interval. The peaks include fluctuation of the reflection area of the petri dish edge in addition to the colony candidate. The peaks are removed in the following steps.

TABLE 3

| PEAK ID | ANGLE |
|---|---|
| 1 | 4 |
| 2 | 22 |
| 3 | 60 |

Next, the candidate detector 30 selects one of unselected peaks from the peaks extracted in Step S32 (Step S33). Next, the candidate detector 30 roots of the selected peak, associates the roots with the peak information and records the associated roots (Step S34). For example, the width at the specific angle "a" is L(a). The angle of the object peak of which roots are obtained is "p". The width at the angle for research is "w". The "w" may be a fixed value determined in advance or may be a value in which the width L(p) is multiplied by a multiple number that is a fixed value. The candidate detector 30 obtains an angle between points on the graph near the peak and the peak and obtains a point on the graph of the maximum value as the peak roots. In concrete, the candidate detector 30 obtains an inclination of the peak with use of the following formulas (3) and (4). The candidate detector 30 obtains a value of "x" at a point where the inclination of the peaks occurs (a start point of protrusion) as the roots of the peak. "low" means a root on the smaller angle side of the peak. "high" means a root on the higher angle side of the peak. $P_{low}$ is "x" in a case of $Ap_{low}$. $P_{high}$ is "x" in a case of $Ap_{high}$. Table 4 shows an example recorded by the candidate detector 30.

[Formula 3]

$$Ap_{low} = \max_{p-w \leq x < p} \frac{L(p) - L(x)}{p - x} \quad (3)$$

[Formula 4]

$$Ap_{high} = \max_{p < x \leq p+w} \frac{L(p) - L(x)}{x - p} \quad (4)$$

TABLE 4

| PEAK ID | ANGLE | ROOT (low) (ANGLE) | ROOT (high) (ANGLE) | INCLINATION (low) | INCLINATION (high) |
|---|---|---|---|---|---|
| 1 | 4 | 3 | 5 | 0.1 | 0.2 |
| 2 | 22 | 18 | 25 | 0.001 | 0.02 |
| 3 | 60 | 45 | 88 | 0.5 | 1.1 |

Next, the candidate detector 30 determines whether an angle between the peak root and the peak is equal to or less than a threshold (Step S35). For example, the candidate detector 30 may determine that the peak is not a colony candidate when one of or both of angles with respect to $Ap_{low}$, and $Ap_{high}$ is equal to or less than the threshold. As illustrated in FIG. 13F, any inclination is less than a threshold because a fluctuation of the width is small in a case of a portion other than a colony. When it is determined as "Yes" in Step S35, the candidate detector 30 deletes the peak (Step S36). FIG. 13G illustrates a graph in which peaks other than the colony candidate are deleted.

Figure 14:
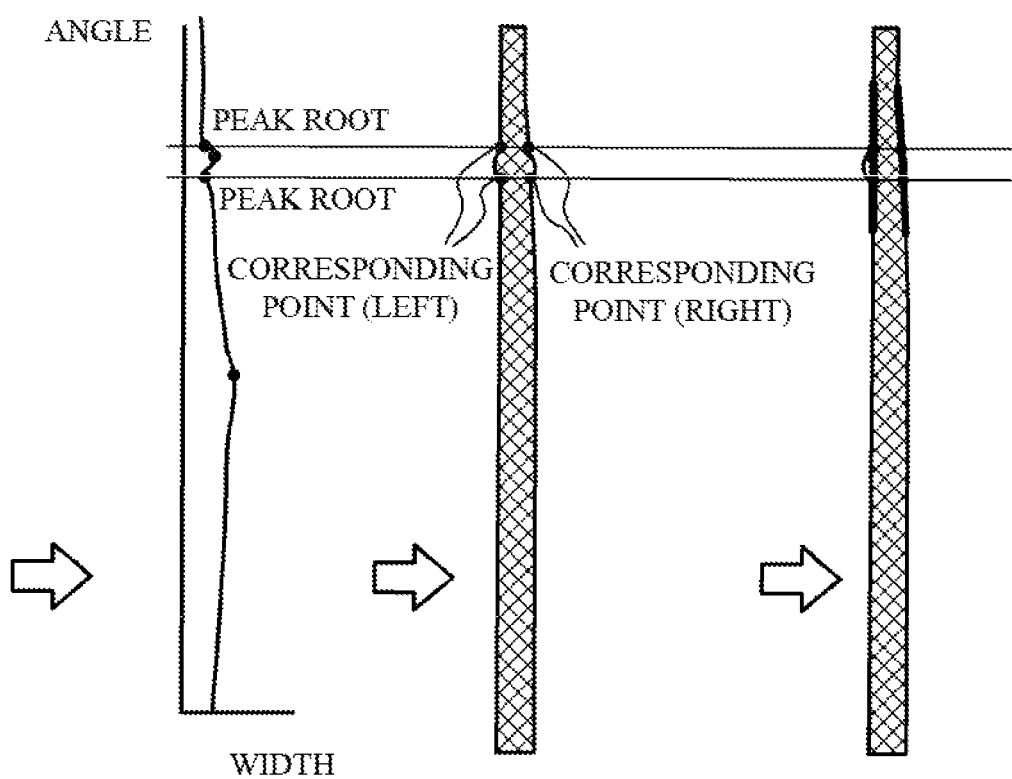
FIG. 14 illustrates a reference line of a protrusion portion.

When it is determined as "No" in Step S35, the candidate detector 30 obtains a reference line of protrusion that connects the peak roots (Step S37). As illustrated in FIG. 14, the candidate detector 30 connects the roots on the both inner side and outer side of the reflection area. In concrete, two lines between ($p_{low}$, $R_{min}(p_{low})$) and ($p_{high}$, $R_{max}(p_{high})$) and between ($p_{low}$, $R_{max}(p_{low})$) and ($p_{high}$, $R_{max}(p_{high})$) are obtained. In this case, the "p" indicates the peak, $p_{low}$ and $p_{high}$, indicate the peak roots, and a minimum radius and a maximum radius at the angle "a" indicate $R_{min}(a)$ and $R_{max}(a)$.

Next, the candidate detector 30 determines whether a colony protrudes from the reference line (Step S38). A protrusion amount $d_{min}(a)$ on the minimum radius side and a protrusion amount $d_{max}(a)$ on the maximum radius side are expressed by the following formulas (5) and (6). And, when a total value of these protrusion amounts is calculated, average values $d_{min}$ and $d_{max}$ of the protrusion amounts can be calculated. Table 5 shows calculation examples of the average of the protrusion amounts.

[Formula 5]

$$d_{min}(a) = \frac{(a - p_{low})}{p_{high} - p_{low}}(R_{min}(p_{high}) - R_{min}(p_{low})) + R_{min}(p_{low}) - R_{min}(a) \quad (5)$$

[Formula 6]

$$d_{max}(a) = \\ R_{max}(a) - \frac{(a - p_{low})}{p_{high} - p_{low}}(R_{max}(p_{high}) - R_{max}(p_{low})) + R_{max}(p_{low}) \quad (6)$$

[Formula 7]

$$d_{min} = \frac{\sum_{a=p_{low}}^{p_{high}}(d_{min}(a))}{p_{high} - p_{low}} \quad (7)$$

[Formula 8]

$$d_{max} = \frac{\sum_{a=p_{low}}^{p_{high}}(d_{max}(a))}{p_{high} - p_{low}} \quad (8)$$

TABLE 5

| PEAK ID | AVERAGE OF PROTRUSION AMOUNT (min) | AVERAGE OF PROTRUSION AMOUNT (max) |
|---|---|---|
| 1 | 1.0 | 2.0 |
| 2 | 1.0 | 0.0 |
| 3 | 25.0 | 31.0 |

A minus value also influences on the above-mentioned formulas (7) and (8). However, only not minus value may influence on the above-mentioned formulas (7) and (8). When a center of the colony candidate does not overlap with a center of the petri dish edge, the peak roots of which protrusion amount is larger can be precisely extracted. However, the peak root of which protrusion amount is smaller may be shifted toward outside. In this case, a range where the $d_{min}(a)$ and the $d_{max}(a)$ of the following formulas (5) and (6) are plus values ($p_{low} < a < p_{high}$) may be extracted. And, the $d_{min}(a)$ and the $d_{max}(a)$ may be used as new peak roots.

The candidate detector 30 determines that there is a protrusion when these values are larger than a predetermined threshold. Two thresholds may be prepared for the determination of the protrusion, and the determination may be performed with use of the two thresholds. For example, thresholds ta and tb are prepared, and ta is smaller than tb. When one of the $d_{min}$ and $d_{max}$ is larger than tb, the projection is determined as a colony candidate. When both the $d_{min}$ and the $d_{max}$ are larger than ta, the following processes are performed. When only one of the $d_{min}$ and $d_{max}$ is larger than ta, the protrusion is not determined as the colony candidate.

Next, the candidate detector 30 determines whether it is determined that the protrusion portion protrudes on the both left side and right side (Step S39). When it is determined as "Yes" in step S39, the candidate detector 30 determines a center point of a line connecting the peaks as a center of the protrusion portion (Step S40) as illustrated in FIG. 1SA.

Next, the candidate detector 30 determines whether the protrusion portion has a circular shape (Step S41). When "p" is the peak, a center position "c" of the peak is expressed by $c = ((R_{min}(p) + R_{max}(p))/2, p)$. A radius "r" in a case where the two peaks constitute a diameter of a circle is expressed by $r = (R_{max}(p) - R_{min}(p))/2$. When the protrusion portion has a circular shape and coordinates of the peak roots $p_{ln} = (d_{min}(plow), p_{low})$, $p_{hn} = (d_{min}(p_{high}), p_{high})$, $p_{lx} = (d_{max}(p_{low}, p_{low})$, $p_{hx} = (d_{max}(p_{high}), p_{high})$ constitute a circle, distances from the center position "c" are constant. Therefore, $d_{ln} = |p_{ln} - c|$, $d_{hn} = |p_{hn} - c|$, $d_{lx} = |p_{lx} - c|$, $d_{hx} = |p_{hx} - c|$, are close to the "r". And so, a square of difference is calculated. When $\sigma = ((d_{ln} - r)^2 + (d_{hn} - r)_2 + (d_{lx} - r)^2 + (d_{hx} - r)^2)/4$ indicating variation is smaller than a threshold, it may be determined that the four points constitute a circle.

When it is determined as "Yes" in Step S41, the candidate detector 30 detects the protrusion portion as a colony candidate (Step S42). FIG. 15B illustrates a detected colony candidate. The candidate detector 30 extracts the area determined as a circle with angles of the roots of upper and lower peaks. The area may be extracted by a straight line. Alternately the area may be extracted as a circle. Further, the candidate detector 30 can obtain a position of an original image by performing an inverse conversion of a polar coordinate with respect to the result of the extraction, as illustrated in HG 15C.

Next, the candidate detector 30 determines whether all peaks are selected (Step S43). When it is determined as "No" in Step S43, Step S33 is executed again. When it is determined as "Yes" in Step S43, the counter 40 counts the colony candidate detected in Step S42, and outputs a result (Step S44). After execution of Step S36, Step S40 is executed. When it is determined as "No" in Step S39 or Step S41, Step S43 is executed. Table 6 shows data examples counted by the counter 40.

TABLE 6

| BACTERIA ID | X | Y | WIDTH | HEIGHT |
|---|---|---|---|---|
| 1 | 450 | 190 | 50 | 22 |
| 2 | 280 | 400 | 2 | 5 |
| 3 | 500 | 800 | 2 | 2 |
| 4 | 320 | 400 | 7 | 7 |
| 5 | 100 | 920 | 6 | 5 |

In Step S44, the counter 40 may output coordinates of the colony candidates (coordinates of a square or the like). For example, in the case of the reflection area of the petri dish edge, the counter 40 extracts coordinates of a square inscribed in an extracted circle from a position of the extracted circle. The counter 40 calculates a maximum value and a minimum value of a position of an ID designated by a labeling result L(x, y) in other cases, and designates the position based on the maximum value and the minimum value. The information may be calculated together with the labeling.

The counter 40 extracts the colony area determined as a circle by angles of an upper and a lower roots of the peak when outputting the area as an image. The counter 40 may extract the colony area as a straight line or may extract the colony area by a circle. Further, the counter 40 obtains the position in an original image by performing an inverse conversion of a polar coordinate of the extraction result. The extraction may be performed after the inverse conversion of the polar coordinate. These may be output together with a detection result of bacteria with respect to areas that are not determined as a slender area (reflection area). When outputting the area as an image, the counter 40 replaces a labeling result L(x, y) of a portion other than bacteria to zero by a reflection of the petri dish edge with respect to the above-mentioned labeling result.

FIG. 16A illustrates a binarized image before detection of the colony candidate by the candidate detector 30. When the colony candidate is detected from the reflection area of the petri dish edge, as illustrated in FIG. 16B, the colony candidate is left as a counting object after deleting the reflection area of the petri dish edge.

In the embodiment, when a protrusion portion protrudes toward both sides perpendicular to a longitudinal direction and the protrusion portion satisfies the second reference regarding a shape in the reflection area of the petri dish edge, the protrusion portion is detected as a colony candidate. It is therefore possible to detect a colony candidate with high accuracy. When the second reference includes that an angle between a line connecting a start point of the protrusion portion (peak roots) and the peak and a longitudinal direction is larger than a threshold in the reflection area of the petri dish edge, the detection accuracy of the colony candidate is improved. However, a determination reference may include that an angle between a line connecting a peak and a point other than the peak of the protrusion portion, other than the line connecting the peak root and the peak, is larger than a threshold.

When it is determined that the protrusion portion protrudes to both sides in a case where a ratio of a protrusion amount with respect to a length of the protrusion portion in a longitudinal direction on the both sides with respect to the longitudinal direction is larger than a threshold, the detection accuracy of the colony candidate is improved. When it is determined that the protrusion portion is a circle in a case where variation of a distance from a center point of a line connecting peaks of the protrusion portions to peak roots, the detection accuracy of the colony candidate is improved. However, in addition to the distance from the center point to the peak roots, the determination reference may be that the variation of the distances from the center point to points other than the peaks of the protrusion portions is equal to or less than a threshold. It may be determined that the protrusion portion is circle, when a circular degree of a shape of the protrusion portion is equal to or larger than a threshold.

[Third Embodiment]

Figure 17A:
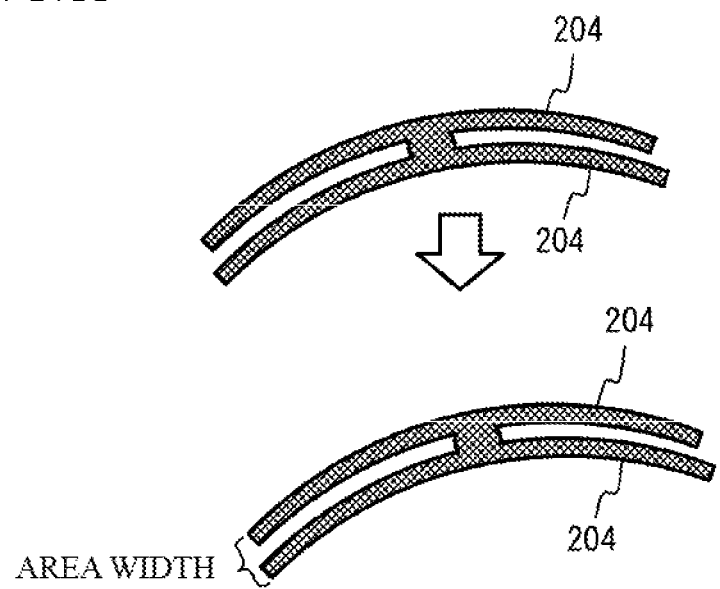
FIG. 17A and FIG. 17B illustrate an example where a colony extends to two reflection areas.

In a third embodiment, another example of Step S21 to S23 of FIG. 7 will be described. Components of the image apparatus 100 are the same as the first embodiment. In FIG. 3A and FIG. 3B, a case where one reflection area 204 caused by a light reflected by the edge of the petri dish 202 appears is described. In accordance with the reflection, two or more reflection areas 204 may occur concentrically. An interval between the concentric reflection areas 204 is usually small. As illustrated in FIG. 17A, the colony extends over the two reflection areas 204, when a colony is between the two concentric reflection areas 204. This results in connection of the two reflection areas 204 through the colony.

Figure 17B:
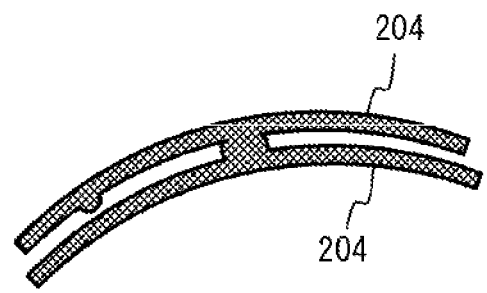

In this case, there is a case where the colony does not protrude outward from the reflection area 204. When a width of the connected area does not change, the connected area may be extracted as a single arc area. As illustrated in FIG. 17B, the colony may contact to one of the two reflection areas 204, between the two reflection areas 204. In this case, a whole of the connected area may be extracted as a single arc area. And so, in the third embodiment, a description will be given of a structure in which a plurality of concentric reflection area is divided and a colony between the plurality of reflection areas is detected.

Figure 18:
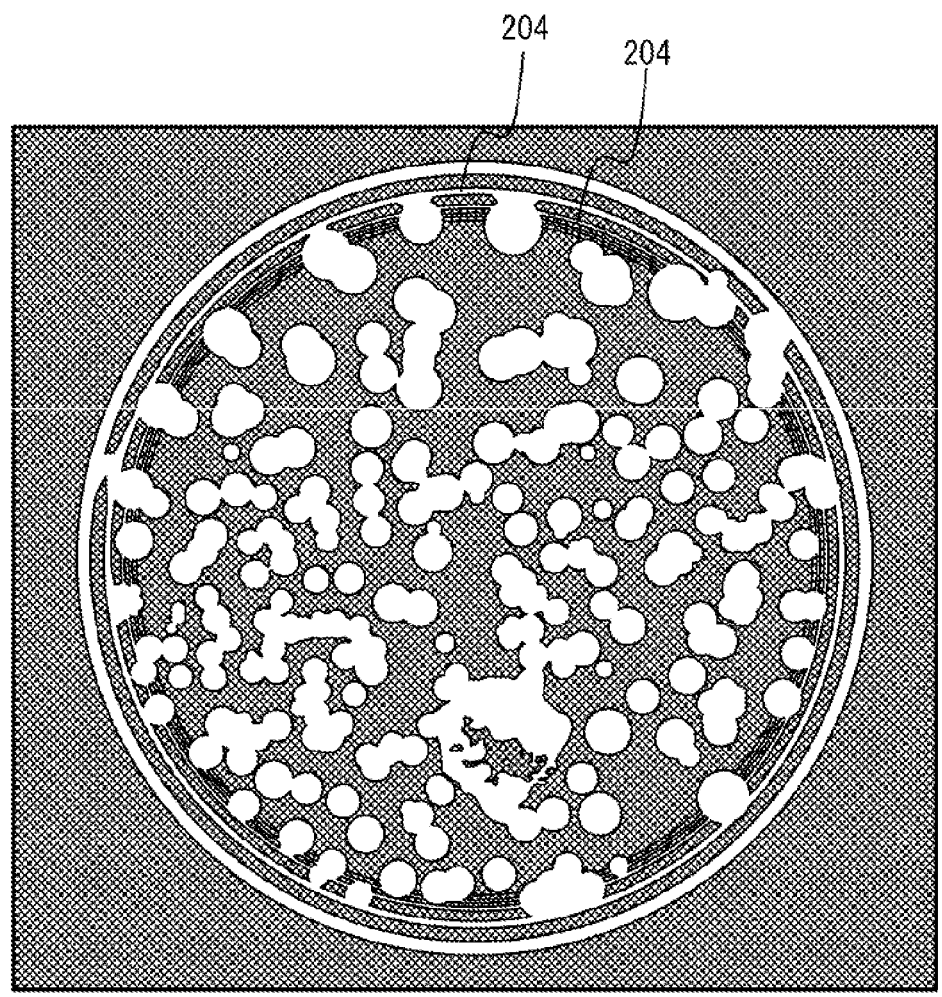
FIG. 18 illustrates a binarized image in which a plurality of reflection areas appear inside of a petri dish.

A description will be given of an outline. FIG. 18 illustrates an image example in a case where the plurality of reflection area 204 appear inside of the petri dish 202. Each reflection area 204 is positioned at an identical radius in a circle shape. Therefore, a part of the reflection area 204 that is not connected with the colony is positioned at an identical circumference. When the reflection area 204 does not contact to the colony, the reflection area 204 extends thinly in the circumference direction and appears in all directions from the center of the petri dish 202. On the other hand, the colony is a circle. Therefore, the colony does not extend thinly in the circumference direction and appears in an single direction from the center of the petri dish 202. When the difference is used, it is possible to extract the position of the reflection area 204.

A width in a radius direction of areas is extracted and a length of an extension of the areas in the circumferential direction is extracted, as a candidate of the reflection area 204 that is not connected to a colony. Thus, it is possible to extract an area where a length in the circumferential direction is larger than a length in the radius direction. Next, the reflection area 204 appears in all directions. Therefore, when there is another long area having a predetermined angle (for example, 90 degrees) or more from the area in an identical radius range, the radius is extracted as the position of the reflection area 204.

In this manner, when the reflection areas 204 appear concentrically, it is possible to separately extract the reflection areas 204 even if there is a colony extending to the concentric circles. When the reflection areas 204 are separately extracted as arc areas, it is possible to detect the colony connected to the reflection area 204. It is therefore possible to count the colony with high accuracy. A description will be given of details.

Figure 19:
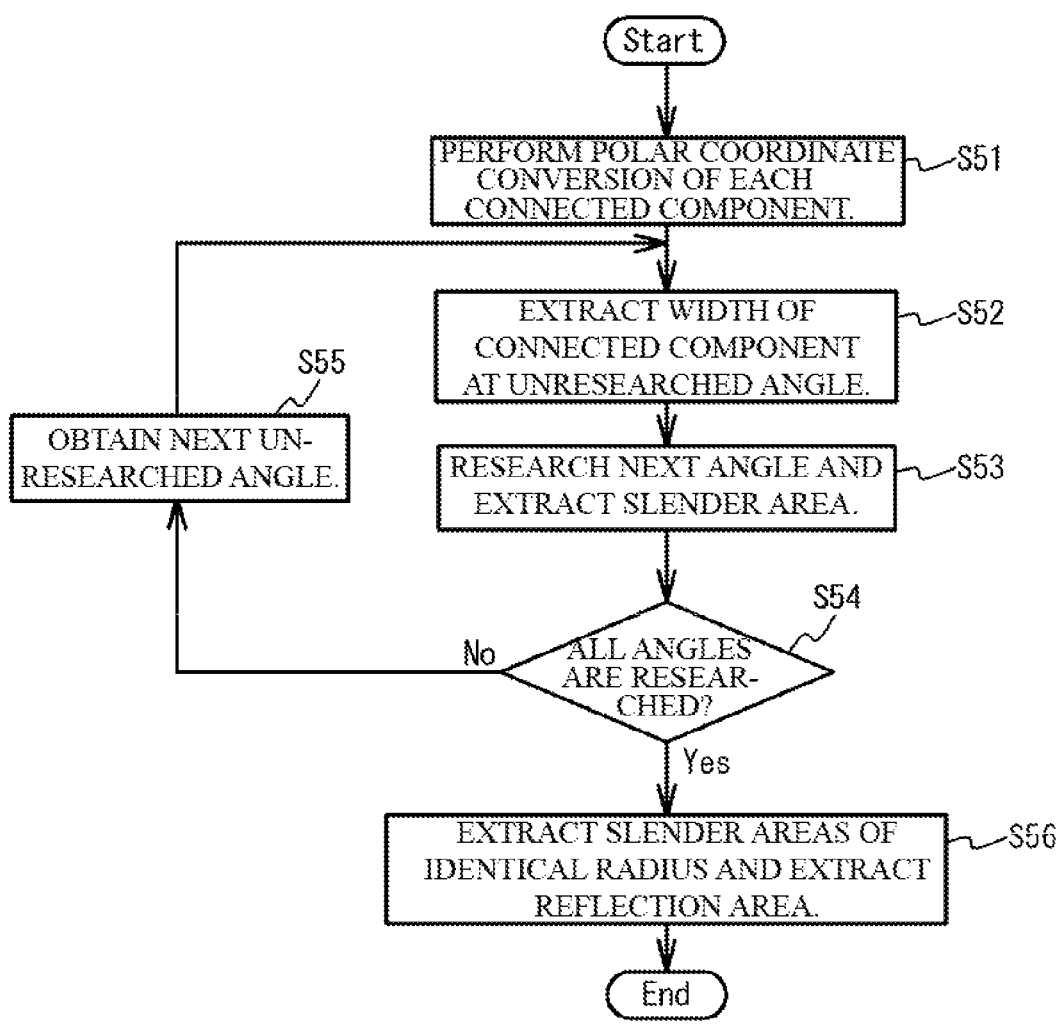
FIG. 19 illustrates a flowchart executed by an analysis area extractor instead of Steps S21 to S23.

FIG. 19 illustrates a flowchart executed by the analysis area extractor 20 instead of Step S21 to Step S23 of FIG. 7. As illustrated in FIG. 19, the analysis area extractor 20 performs a polar coordinate conversion with respect to each connected component by the same process as Step S21 (Step S51). The polar coordinate conversion is a process in which a orthogonal coordinate p(x, y) is converted into a coordinate p'(r, θ) of a radius and an angle.

Next, the analysis area extractor 20 extracts a width of each connected component (Step S52). In concrete, a start radius of an area having a brightness value of 255 is "r" in a case where p'(r−1, θ)=0 and p'(r, θ)=255 in a straight line extending from a center to each outer circumference at an un-researched angle θ. An end radius of the area having the brightness value of 255 is "r" in a case where p'(r−1, θ)=255 and p'(r, θ)=0.

Next, the analysis area extractor 20 extracts a slender area with use of the result of Step S52 (Step S53). In concrete, the analysis area extractor 20 extracts an area in which the width extracted in Step S52 is equal to or less than a threshold and a length having the width is equal to or more than a threshold, as the slender area.

Next, the analysis area extractor 20 determines whether all angles area researched (Step S54). When it is determined as "No" in Step S54, analysis area extractor 20 sets a research object to an adjacent angle (Step S55). The angles adjacent to each other are different from each other by 0.1 degree. After that, Step S52 is executed again.

When it is determined as "Yes" in Step S54, the analysis area extractor 20 extracts slender areas having the same radius and extracts the reflection area 204 (Step S56). In concrete, the analysis area extractor 20 extracts the slender area as the reflection area when there is an area having the brightness value of 255 in the same range from the center position at different angles with respect to the slender areas extracted in Step S53. This includes a case where a single slender area extends at different angles. These are the same as a case where an area having the brightness value of 255 appears in the same range from the center position in straight lines from the center to outer circumferences.

With the processes, the analysis area extractor 20 can extract the reflection area of the petri dish edge. After that, by executing the processes after Step S3 of FIG. 5, it is possible to detect colonies with high accuracy even if the reflection area of the petri dish edge overlaps with colonies.

Figure 20:
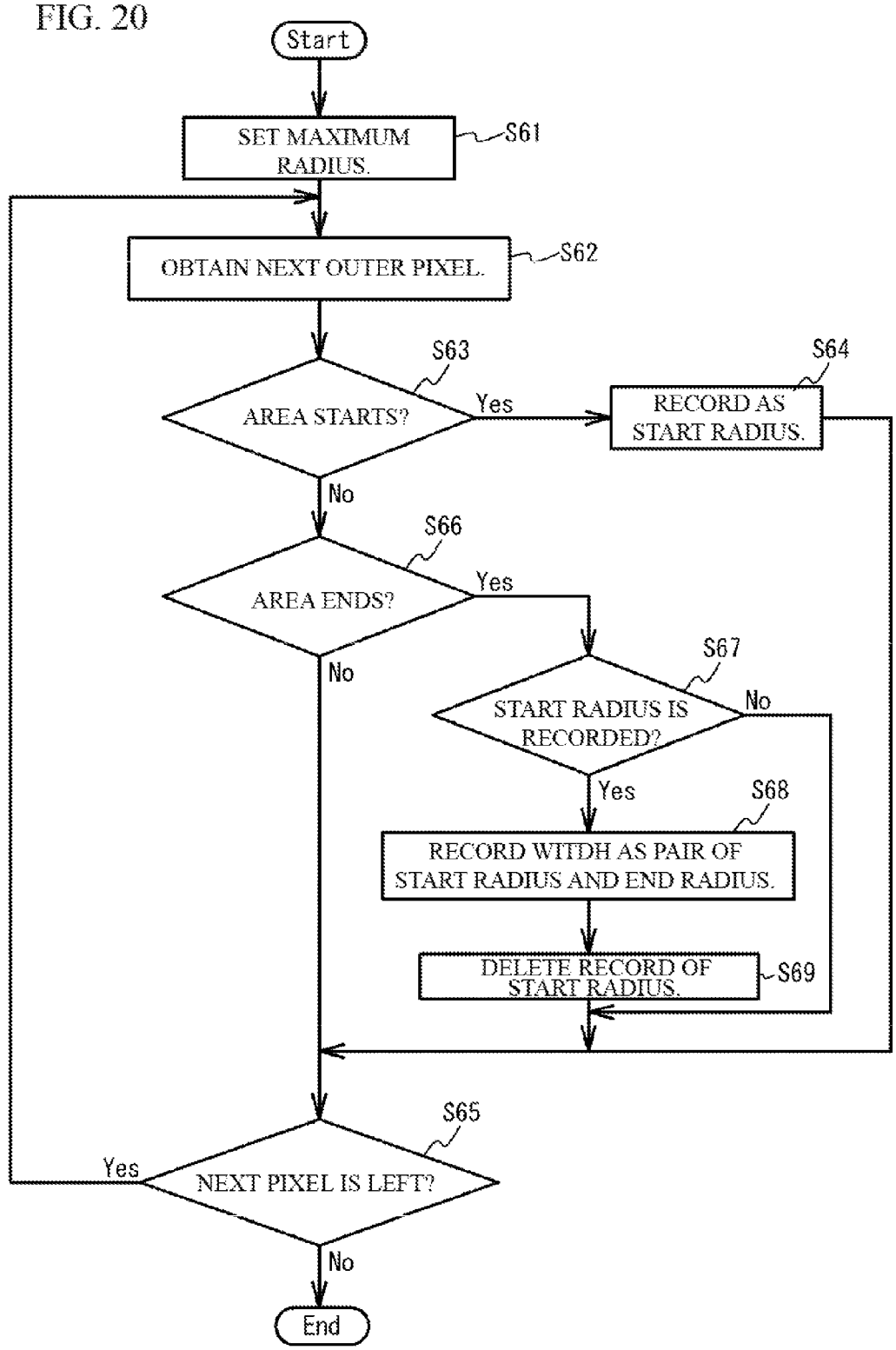
FIG. 20 illustrates a flowchart describing details of Step S52.

FIG. 20 illustrates a flowchart of details of Step S52. The flowchart of FIG. 20 is executed with respect to each angle with an angle interval of 0.1 degree. The analysis area extractor 20 determines a maximum radius in a binarized image of which the petri dish edge is deleted (Step S61). The maximum radius is a distance from the center (Cx, Cy) to the outer circumference in the circular binarized image of which the petri dish edge is deleted. In other words, the maximum radius is an inner diameter of the petri dish edge.

Next, at an angle θ, the analysis area extractor 20 obtains an outer pixel next to a current pixel on a straight line from the center of the petri dish to the outer circumference (Step 362.). An initial value is the center (Cx, Cy). Therefore, when Step S62 is repeatedly executed, pixels are obtained in order from the center (Cx, Cy) to the outer circumference. Next, the analysis area extractor 20 determines whether the pixel obtained in Step S62 is a start point of an area having the brightness value of 255 (Step S63). In Step S63, when p'(r−1, θ)=0 and p'(r, θ)=255, it is determined as "Yes". That is, a pixel at which the brightness value is changed from 0 to 255 in the binarized image is a start radius.

When it is determined as "Yes" in Step S63, the analysis area extractor 20 records the pixel as the start radius of the area having the brightness value of 255 (Step S64). After execution of Step S64, the analysis area extractor 20 determines whether there is a pixel that is not obtained (Step S65). In Step S65, it is determined whether an outer pixel next to the current pixel is equal to or less than a maximum radius that is set in Step S61. When it is determined as "Yes" in Step S65, Step S62 is executed again.

When it is determined as "No" in Step S63, it is determined whether the area having the brightness value of 255 terminates at an outer pixel next to the current pixel (Step S66). In Step S66, when p'(r−1, θ)=255 and p'(r, θ)=0, it is determined as "Yes". That is, when the brightness value is changed from 255 to 0 in the binarized image, the area having the brightness value of 255 terminates.

When it is determined as "No" in Step S66, Step S65 is executed. When it is determined as "Yes" in Step S66, the analysis area extractor 20 determines whether the start radius is recorded (Step S67). When it is determined as "Yes" in Step S67, the analysis area extractor 20 records a width as a pair of the start radius and the end radius (Step S68). The end radius is a radius position at the current object pixel. After Step S68, the analysis area extractor 20 deletes the recorded start radius (Step S69). After that, Step S65 is executed. When it is determined as "No" in Step S67, Step S65 is executed.

Figures 21A, 21B:
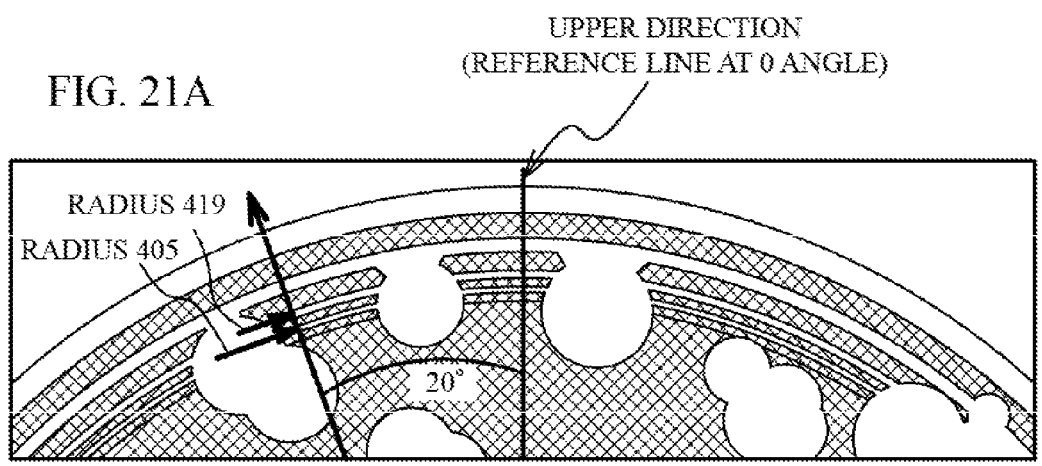
FIG. 21A and FIG. 21B illustrate a start radius and an end radius at an angle θ=20 degrees.

FIG. 21A and FIG. 21B illustrate the start radius and the end radius at an angle θ=20 degrees. The petri dish edge and the reflection of the petri dish edge appear only in an area near an area out of the petri dish. Therefore, with respect to the start radius and the end radius, a radius position range where the petri dish edge possibly appears may be designated in advance. And the process may be performed when the radius position range includes the start radius and the end radius.

Figure 22:
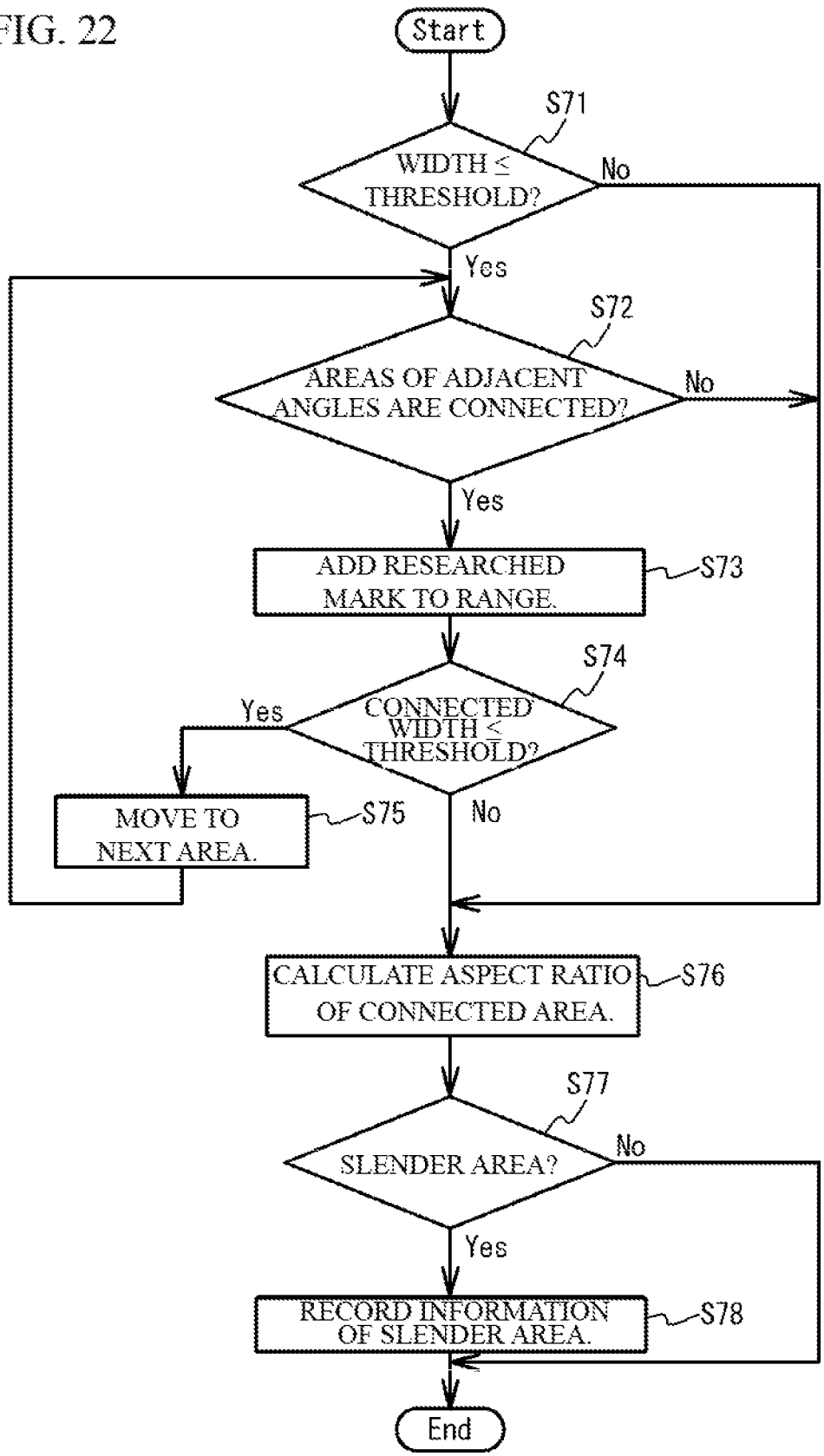
FIG. 22 illustrates a flowchart describing details of Step S53.

FIG. 22 illustrates a flowchart of details of Step S53. The flowchart of FIG. 22 is executed with respect to all widths extracted in Step S52. As illustrated in FIG. 22, the analysis area extractor 20 determines whether a width without a researched mark is equal to or less than a threshold $T_{width}$ (Step S71).

When it is determined as "Yes" in Step S71, the analysis area extractor 20 determines whether areas at adjacent angles are in touch with each other (Step S72). In concrete, when widths satisfy the following formula (9) at the adjacent angles, it may be determined that the areas are in touch with each other. Two widths overlap with each other with a ratio that is equal to or more than a threshold ($=T_{overlap}$).

[Formula 9]

$$\frac{\max(s(a), s(a+1)) - \min(e(a), e(a+1))}{\max(e(a) - s(a), e(a+1) - s(a+1))} \geq T_{overlap} \quad (9)$$

In the formula (9), "a" indicates an angle. "s(a)" indicates the start radius at an angle "a", "e(a)" indicated the end radius at the angle "a.". "a+1" in (a+1) indicates an angle next to s(a). Therefore, when the flowchart of FIG. 20 is executed at every 0.1 degree, "a+1" indicates (a+0.1) degree.

When it is determined as "Yes" in Step S72, the analysis area extractor 20 adds the researched mark to the object area in Step S72 (Step S73). Next, the analysis area extractor 20 uses the following formula (10) and determines whether the width (w') connected with the adjacent angles is equal to or less than the threshold $T_{width}$ (Step S74). When it is determined as "Yes" in Step S74, the analysis area extractor 20 notifies the adjacent angles (Step S75), and executes Step S72 again. FIG. 23A illustrates an area obtained through repetition of Step S72 to Step S75.

[Formula 10]

$$w'(a, b) = \max_{a \leq i \leq b} e(i) - \min_{a \leq i \leq h} s(i) \leq T_{width} \quad (10)$$

When it is determined as "No" in Step S74 or it is determined as "No" in Step S72, the analysis area extractor 20 calculates an aspect ratio between a width and a length of the connected area (Step S76). Next, the analysis area extractor 20 determines whether the connected area is a slender area (Step S77). In Step S77, the following formula (11) may be used. FIG. 23B illustrates the aspect ratio calculated with respect to the result of FIG. 23A. When a threshold $T_{aspect}$ is 3.0, a first area and a second area are determined as the slender area (No in S77) and a third area is determined as not slender area (No in S77). Next, the analysis area extractor 20 records information of the slender area (Step S78).

[Formula 11]

$$\text{ASPECT RATIO} = \frac{[\text{END ANGLE}] - [\text{START ANGLE}]}{[\text{END RADIUS}] - [\text{SRTART RADIUS}]} \geq T_{aspect}$$

Figure 24:
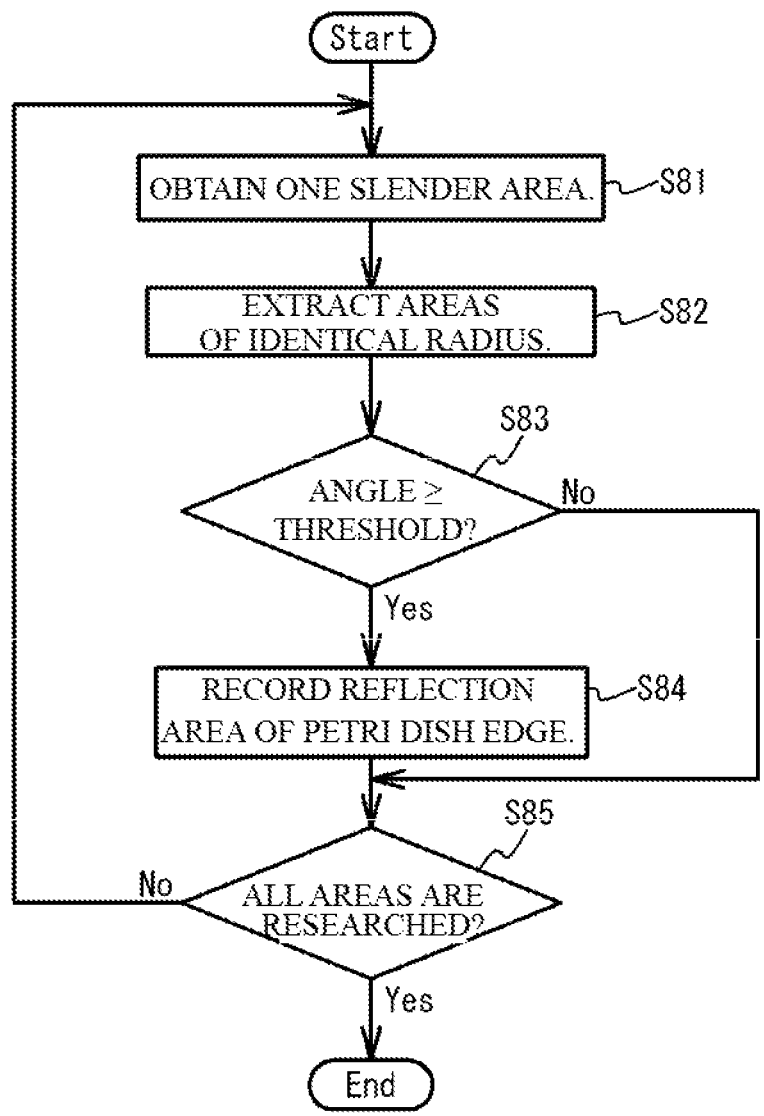
FIG. 24 illustrates details of Step S56.

FIG. 24 illustrates a flowchart of details of Step S56. As illustrated in FIG. 24, the analysis area extractor 20 obtains one of the slender areas extracted in Step S53 (Step S81). Next, the analysis area extractor 20 extracts areas in an identical radius range from the slender areas (Step S82). When the analysis area extractor 20 determines whether the two areas are in the identical radius area, the following formula (12) may be used as well as the formula (9). A threshold in this case may be the same as the $T_{overlap}$ or may be different from the $T_{overlap}$. In the following formula (12), s(a) indicates the start radius of the slender area "a". e(a) indicates the end radius of the slender area "a". s(b) indicates the start radius of the slender area "b". e(b) indicates the end radius of the slender area

[Formula 12]

$$\frac{\max(s(a), s(b)) - \min(e(a), e(b))}{\max(e(a) - s(a), e(b) - s(b))} \geq T_{overlap} \quad (12)$$

Next, the analysis area extractor 20 determines whether an angle of the extracted ranges is equal to or greater than a threshold (Step S83). For example, when an angle of a slender area "a" is s(a) to e(a), it may be determined whether the angle between the two slender areas "a" and "b" is equal to or greater than a designated angle $T_{angle}$ with use of the following formula (13).

[Formula 13]

$$\text{Max}(E(a), E(b)) - \min(S(a), S(b)) \geq T_{angle} \quad (13)$$

When it is determined as "Yes" in Step S83, the analysis area extractor 20 extracts the area as the reflection area and records the extracted area (Step S84). Next, the analysis area extractor 20 determines whether all slender areas are researched (Step S85). When it is determined as "No" in Step S83, Step S85 is executed. When it is determined as "No" in Step S85, Step S81 is executed again. When it is determined as "Yes" in Step S85, the flowchart is terminated.

The flowchart of FIG. 24 is executed under a condition that two areas are spaced from each other by a predetermined angle or more. As expressed by the following formula 14, when a single area extends with a predetermined interval or more, the single area may be extracted as the reflection area. When there is only one slender area, the slender area may be extracted as the reflection area when an aspect ratio of the extracted slender area is equal to or greater than a threshold (for example, $T_{aspect}=5$).

[Formula 14]

$$E(a) - S(a) \geq T_{angle} \quad (14)$$

When there is only one slender area, the slender area may be extracted as the reflection of the petri dish edge when an aspect ratio calculated by the slender area extractor is equal to or greater than a threshold (for example, $T_{aspect}=5$).

In the embodiment, when a plurality of reflection areas concentrically appear, it is possible to separate the reflection areas from each other and extract the reflection areas. Therefore, even if a colony connecting the reflection areas appears, it is possible to count the colony. Accordingly, it is possible to detect the colony with high accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An image apparatus comprising:
a memory; and
a processor, wherein the processor is configured to:
extract a reflection area of a petri dish in an image captured by an image sensor; and
determine whether a portion that protrudes from an arc in the reflection area satisfies a first reference regarding a shape and detect the portion as a bacterium colony candidate when it is determined that the portion satisfies the first reference.

2. The image apparatus as claimed in claim 1, wherein the first reference includes that a ratio of a protrusion amount of the portion with respect to a length of the protrusion portion in a longitudinal direction of the reflection area exceeds a threshold.

3. The image apparatus as claimed in claim 1, wherein the first reference includes that the protrusion portion protrudes to both sides perpendicular to the longitudinal direction of the reflection area and the protrusion portion protruding to the both sides satisfies a second reference regarding a shape.

4. The image apparatus as claimed in claim 3, wherein the second reference includes that a line connecting a peak and a point other than the peak in the protrusion portion satisfies a predetermined condition.

5. The image apparatus as claimed in claim 3, wherein the second reference includes a reference for determining whether the protrusion portion protruding to the both sides has a circular shape.

6. The image apparatus as claimed in claim 1, wherein an area in which a ratio of a length of the longitudinal direction with respect to a width exceeds a threshold is extracted as the reflection area.

7. The image apparatus as claimed in claim 1, wherein a center position and an outer circumference of a petri dish is determined in an image captured by the image sensor, a pixel value of straight lines directed from the center position to each position of the outer circumference is obtained with respect to each of the straight lines, and an arc is extracted as the reflection area when a predetermined pixel value of a predetermined pixel value range appears in ranges having a predetermined distance range from the center position, the arc connecting the ranges.

8. An image processing method comprising:
extracting a reflection area of a petri dish in an image captured by an image sensor;
determining whether a portion that protrudes from an arc in the reflection area satisfies a first reference regarding a shape; and
detecting the portion as a bacterium colony candidate when it is determined that the portion satisfies the first reference.

9. The method as claimed in claim 8, wherein the first reference includes that a ratio of a protrusion amount of the portion with respect to a length of the protrusion portion in a longitudinal direction of the reflection area exceeds a threshold.

10. The method as claimed in claim 8, wherein the first reference includes that the protrusion portion protrudes to both sides perpendicular to the longitudinal direction of the reflection area and the protrusion portion protruding to the both sides satisfies a second reference regarding a shape.

11. The method as claimed in claim 10, wherein the second reference includes that a line connecting a peak and a point other than the peak in the protrusion portion satisfies a predetermined condition.

12. The method as claimed in claim 10, wherein the second reference includes a reference for determining whether the protrusion portion protruding to the both sides has a circular shape.

13. The method as claimed in claim 8, wherein, in the extracting, an area in which a ratio of a length of the longitudinal direction with respect to a width exceeds a threshold is extracted as the reflection area.

14. The method as claimed in claim 8, wherein, in the extracting, a center position and an outer circumference of a petri dish is determined in an image captured by the image sensor, a pixel value of straight lines directed from the center position to each position of the outer circumference is obtained with respect to each of the straight lines, and an arc is extracted as the reflection area when a predetermined pixel value of a predetermined pixel value range appears in ranges having a predetermined distance range from the center position, the arc connecting the ranges.

15. A computer readable, non-transitory medium storing a program that causes a computer to execute a process, the process comprising:
   extracting a reflection area in an image captured by an image sensor;
   determining whether a portion that protrudes from an arc in the reflection area satisfies a first reference regarding a shape; and
   detecting the portion as a bacterium colony candidate when it is determined that the portion satisfies the first reference.

16. The medium as claimed in claim 15, wherein the first reference includes that a ratio of a protrusion amount of the portion with respect to a length of the protrusion portion in a longitudinal direction of the reflection area exceeds a threshold.

17. The medium as claimed in claim 15, wherein the first reference includes that the protrusion portion protrudes to both sides perpendicular to the longitudinal direction of the reflection area and the protrusion portion protruding to the both sides satisfies a second reference regarding a shape.

18. The medium as claimed in claim 17, wherein the second reference includes that a line connecting a peak and a point other than the peak in the protrusion portion satisfies a predetermined condition.

19. The medium as claimed in claim 17, wherein the second reference includes a reference for determining whether the protrusion portion protruding to the both sides has a circular shape.

20. The medium as claimed in claim 15, wherein, in the extracting, an area in which a ratio of a length of the longitudinal direction with respect to a width exceeds a threshold is extracted as the reflection area.

* * * * *